("United States Patent")

United States Patent
Biskeborn et al.

(10) Patent No.: US 9,721,602 B2
(45) Date of Patent: Aug. 1, 2017

(54) MAGNETIC HEAD AND SYSTEM HAVING OFFSET ARRAYS

(71) Applicant: International Business Machines Corporation, Armonk, NY (US)

(72) Inventors: Robert G. Biskeborn, Hollister, CA (US); Philipp Herget, San Jose, CA (US); Calvin S. Lo, Saratoga, CA (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 14/860,464

(22) Filed: Sep. 21, 2015

(65) Prior Publication Data

US 2016/0012840 A1   Jan. 14, 2016

Related U.S. Application Data

(62) Division of application No. 13/875,226, filed on May 1, 2013, now Pat. No. 9,208,809.

(51) Int. Cl.
  *G11B 5/265*    (2006.01)
  *G11B 5/29*    (2006.01)
  (Continued)

(52) U.S. Cl.
  CPC .......... *G11B 5/588* (2013.01); *G11B 5/00813* (2013.01); *G11B 5/00826* (2013.01);
  (Continued)

(58) Field of Classification Search
  None
  See application file for complete search history.

(56) References Cited

U.S. PATENT DOCUMENTS 3,893,176 A   7/1975   Jones
3,924,268 A   12/1975   McIntosh et al.
(Continued)

FOREIGN PATENT DOCUMENTS

CN   1920954 A   2/2007
CN   101149931 A   3/2008
(Continued)

OTHER PUBLICATIONS

Supplemental Notice of Allowance from U.S. Appl. No. 14/105,082, dated Sep. 30, 2015.
(Continued)

*Primary Examiner* — Craig A. Renner
(74) *Attorney, Agent, or Firm* — Zilka-Kotab, P.C.

(57) ABSTRACT

A computer program product for orienting a head includes a computer readable storage medium having program instructions embodied therewith. The program instructions are readable and/or executable by a controller to cause the controller to: determine a desired pitch for transducers for reading and/or writing to a magnetic tape; and cause a mechanism to orient a head to achieve the desired pitch. The array of a first of the modules is offset from the array of a second of the modules in a first direction parallel to the axis of the array of the second module such that the transducers of the first module are about aligned with the transducers of the second module in the intended direction of tape travel thereacross when the axes are oriented at an angle greater than 0.2° relative to a line oriented perpendicular to the intended direction of tape travel.

15 Claims, 14 Drawing Sheets

(51) Int. Cl.

| | | |
|---|---|---|
| G11B 5/584 | (2006.01) | |
| G11B 5/56 | (2006.01) | |
| G11B 5/008 | (2006.01) | |
| G11B 5/588 | (2006.01) | |
| G11B 5/115 | (2006.01) | |
| G11B 5/48 | (2006.01) | |
| G11B 5/09 | (2006.01) | |
| G11B 5/11 | (2006.01) | |

(52) U.S. Cl.
CPC .................. *G11B 5/09* (2013.01); *G11B 5/11* (2013.01); *G11B 5/115* (2013.01); *G11B 5/2652* (2013.01); *G11B 5/29* (2013.01); *G11B 5/4893* (2013.01); *G11B 5/56* (2013.01); *G11B 5/584* (2013.01)

(56) References Cited

U.S. PATENT DOCUMENTS

| | | |
|---|---|---|
| 3,943,566 A | 3/1976 | Brock et al. |
| 4,539,615 A | 9/1985 | Arai et al. |
| 4,752,846 A | 6/1988 | Proehl |
| 4,821,129 A | 4/1989 | Culp |
| 4,922,352 A | 5/1990 | Culp |
| 5,060,210 A | 10/1991 | Fennema et al. |
| 5,307,217 A | 4/1994 | Saliba |
| 5,331,493 A | 7/1994 | Schwarz |
| 5,371,638 A | 12/1994 | Saliba |
| 5,680,278 A | 10/1997 | Sawtelle, Jr. |
| 5,684,656 A | 11/1997 | Jung |
| 5,854,726 A | 12/1998 | Kubota et al. |
| 5,862,014 A | 1/1999 | Nute |
| 5,867,339 A | 2/1999 | Panish et al. |
| 5,883,760 A | 3/1999 | Yamada et al. |
| 6,038,108 A | 3/2000 | Dee et al. |
| 6,088,184 A | 7/2000 | Hu |
| 6,130,804 A | 10/2000 | Panish et al. |
| 6,188,532 B1 | 2/2001 | Albrecht et al. |
| 6,188,535 B1 | 2/2001 | Lemke et al. |
| 6,222,698 B1 | 4/2001 | Barndt et al. |
| 6,275,350 B1 | 8/2001 | Barndt |
| 6,307,718 B1 | 10/2001 | Kasetty |
| 6,339,793 B1 | 1/2002 | Bostian et al. |
| 6,369,982 B2 | 4/2002 | Saliba |
| 6,445,538 B1 | 9/2002 | McKinstry et al. |
| 6,650,496 B2 | 11/2003 | Nozieres et al. |
| 6,690,542 B1 | 2/2004 | Wang |
| 6,751,055 B1 | 6/2004 | Alfoqaha et al. |
| 6,757,128 B2 | 6/2004 | Yip |
| 6,781,784 B2 | 8/2004 | Peterson |
| 6,947,247 B2 | 9/2005 | Schwarz et al. |
| 6,965,490 B2 | 11/2005 | Ito |
| 7,009,812 B2 | 3/2006 | Hsu et al. |
| 7,054,093 B1 | 5/2006 | Anderson et al. |
| 7,142,388 B2 | 11/2006 | Tateishi et al. |
| 7,193,812 B2 | 3/2007 | Eaton |
| 7,239,465 B1 | 7/2007 | Watson et al. |
| 7,253,986 B2 | 8/2007 | Berman et al. |
| 7,342,738 B1 | 3/2008 | Anderson et al. |
| 7,428,120 B2 | 9/2008 | Berman et al. |
| 7,474,488 B2 | 1/2009 | Czarnecki et al. |
| 7,480,117 B2 | 1/2009 | Biskeborn et al. |
| 7,486,464 B2 | 2/2009 | Saliba |
| 7,681,793 B2 | 3/2010 | Biskeborn et al. |
| 7,724,459 B2 | 5/2010 | Czarnecki et al. |
| 7,764,460 B2 | 7/2010 | Bates et al. |
| 7,766,236 B2 | 8/2010 | Biskeborn et al. |
| 7,889,454 B2 | 2/2011 | Johnson et al. |
| 7,952,832 B2 | 5/2011 | Biskeborn et al. |
| 8,004,792 B2 | 8/2011 | Biskeborn et al. |
| 8,045,290 B2 | 10/2011 | McKinstry et al. |
| 8,054,576 B2 | 11/2011 | Bui et al. |
| 8,054,579 B2 | 11/2011 | Biskeborn |
| 8,094,402 B2 | 1/2012 | Bui et al. |
| 8,130,467 B2 | 3/2012 | Biskeborn et al. |
| 8,154,811 B2 | 4/2012 | Barsotti et al. |
| 8,265,487 B2 | 9/2012 | Schunk |
| 8,587,902 B2 | 11/2013 | Biskeborn et al. |
| 8,599,508 B1 | 12/2013 | Burd |
| 8,687,324 B2 | 4/2014 | Biskeborn et al. |
| 8,773,795 B1 | 7/2014 | Biskeborn |
| 8,797,682 B1 | 8/2014 | Biskeborn et al. |
| 8,810,957 B1 | 8/2014 | Biskeborn et al. |
| 8,902,528 B1 | 12/2014 | Biskeborn et al. |
| 8,976,482 B2 | 3/2015 | Cherubini et al. |
| 9,007,712 B1 | 4/2015 | Biskeborn et al. |
| 9,129,614 B2 | 9/2015 | Biskeborn et al. |
| 9,208,809 B2 | 12/2015 | Biskeborn et al. |
| 9,218,838 B2 | 12/2015 | Biskeborn et al. |
| 9,355,665 B2 | 5/2016 | Biskeborn et al. |
| 9,449,628 B2 | 9/2016 | Biskeborn et al. |
| 9,595,276 B2 | 3/2017 | Biskeborn et al. |
| 9,607,639 B2 | 3/2017 | Biskeborn et al. |
| 2001/0015870 A1 | 8/2001 | Saliba |
| 2002/0034042 A1 | 3/2002 | Hungerford et al. |
| 2002/0163752 A1 | 11/2002 | Peterson |
| 2002/0186496 A1 | 12/2002 | Saliba et al. |
| 2004/0223248 A1 | 11/2004 | Dugas et al. |
| 2005/0068671 A1 | 3/2005 | Hsu et al. |
| 2005/0152067 A1 | 7/2005 | Yip et al. |
| 2005/0157422 A1 | 7/2005 | Dugas et al. |
| 2005/0168865 A1 | 8/2005 | Simmons, Jr. et al. |
| 2005/0259364 A1 | 11/2005 | Yip |
| 2006/0039082 A1 | 2/2006 | Biskeborn et al. |
| 2006/0126207 A1 | 6/2006 | Johnson et al. |
| 2006/0126212 A1 | 6/2006 | Anderson et al. |
| 2006/0232884 A1 | 10/2006 | Biskeborn |
| 2007/0047146 A1 | 3/2007 | Biskeborn et al. |
| 2007/0242378 A1 | 10/2007 | Ikegami et al. |
| 2007/0285838 A1 | 12/2007 | Hennecken et al. |
| 2008/0068750 A1 | 3/2008 | Biskeborn et al. |
| 2008/0088963 A1 | 4/2008 | Biskeborn et al. |
| 2008/0137235 A1 | 6/2008 | Biskeborn et al. |
| 2008/0158720 A1 | 7/2008 | Watson |
| 2008/0273258 A1 | 11/2008 | Berman et al. |
| 2008/0285167 A1 | 11/2008 | Biskeborn et al. |
| 2008/0291566 A1 | 11/2008 | Biskeborn et al. |
| 2009/0027803 A1 | 1/2009 | Biskeborn et al. |
| 2009/0128949 A1 | 5/2009 | Matsuno et al. |
| 2009/0174963 A1 | 7/2009 | Liang et al. |
| 2009/0213493 A1 | 8/2009 | Bui et al. |
| 2009/0219648 A1 | 9/2009 | Jaquette |
| 2009/0231756 A1 | 9/2009 | Koeppe |
| 2009/0231757 A1 | 9/2009 | Biskeborn et al. |
| 2009/0279205 A1 | 11/2009 | Hennecken |
| 2009/0316296 A1 | 12/2009 | Cherubini et al. |
| 2010/0110587 A1 | 5/2010 | Biskeborn et al. |
| 2011/0002065 A1 | 1/2011 | Dugas et al. |
| 2011/0051283 A1 | 3/2011 | Harper et al. |
| 2011/0170214 A1 | 7/2011 | Bui et al. |
| 2011/0182157 A1 | 7/2011 | Hoerger |
| 2011/0199701 A1 | 8/2011 | Bui et al. |
| 2011/0310511 A1 | 12/2011 | Edelman et al. |
| 2012/0008234 A1 | 1/2012 | Biskeborn et al. |
| 2012/0050909 A1 | 3/2012 | Lantz et al. |
| 2012/0200952 A1 | 8/2012 | Bui et al. |
| 2012/0206832 A1 | 8/2012 | Hamidi et al. |
| 2013/0286502 A1 | 10/2013 | Erden et al. |
| 2014/0016226 A1 | 1/2014 | Bui et al. |
| 2014/0036393 A1 | 2/2014 | Biskeborn et al. |
| 2014/0153127 A1 | 6/2014 | Kawabe et al. |
| 2014/0192435 A1 | 7/2014 | Buch |
| 2014/0327983 A1 | 11/2014 | Biskeborn et al. |
| 2014/0327984 A1 | 11/2014 | Biskeborn et al. |
| 2014/0327987 A1 | 11/2014 | Biskeborn et al. |
| 2014/0334033 A1 | 11/2014 | Biskeborn et al. |
| 2015/0043101 A1 | 2/2015 | Biskeborn et al. |
| 2015/0062742 A1 | 3/2015 | Biskeborn et al. |
| 2015/0077880 A1 | 3/2015 | Biskeborn et al. |
| 2015/0170691 A1 | 6/2015 | Biskeborn et al. |
| 2015/0187379 A1 | 7/2015 | Biskeborn et al. |
| 2016/0005429 A1 | 1/2016 | Biskeborn et al. |

(56) References Cited

U.S. PATENT DOCUMENTS

| | | | |
|---|---|---|---|
| 2016/0012841 A1 | 1/2016 | Biskeborn et al. | |
| 2016/0049167 A1 | 2/2016 | Biskeborn et al. | |
| 2016/0055871 A1 | 2/2016 | Biskeborn et al. | |

FOREIGN PATENT DOCUMENTS

| | | | |
|---|---|---|---|
| CN | 101202050 A | 6/2008 | |
| EP | 0478276 A2 | 4/1992 | |
| EP | 0883120 A1 | 12/1998 | |
| EP | 0959454 A2 | 11/1999 | |
| EP | 1030300 A2 | 8/2000 | |
| EP | 1204096 A2 | 5/2002 | |
| GB | 1516045 A | 6/1978 | |
| GB | 2501521 A | 10/2013 | |
| JP | 2005108412 A | 4/2005 | |
| JP | 2006172705 A | 6/2006 | |
| JP | 2008146818 A | 6/2008 | |
| JP | 5043615 B2 | 10/2012 | |
| KR | 0183774 B1 | 4/1999 | |
| WO | 0057403 A2 | 9/2000 | |
| WO | 2007093107 A1 | 8/2007 | |
| WO | 2009141231 A2 | 11/2009 | |
| WO | 2010047679 A1 | 4/2010 | |
| WO | 2011067052 A1 | 6/2011 | |
| WO | 2014164183 A1 | 10/2014 | |

OTHER PUBLICATIONS

Biskeborn et al., U.S. Appl. No. 14/860,522, filed Sep. 21, 2015.
Biskeborn et al., U.S. Appl. No. 14/852,400, filed Sep. 11, 2015.
Supplemental Notice of Allowance from U.S. Appl. No. 13/875,226, dated Sep. 14, 2015.
Supplemental Notice of Allowance from U.S. Appl. No. 13/875,226, dated Oct. 20, 2015.
Biskeborn et al., U.S. Appl. No. 14/924,622, filed Oct. 27, 2015.
Biskeborn et al., U.S. Appl. No. 14/934,023, filed Nov. 5, 2015.
Restriction Requirement from U.S. Appl. No. 14/924,622, dated Jan. 14, 2016.
Final Office Action from U.S. Appl. No. 13/875,231, dated Dec. 31, 2015.
Argumedo et al., "Scaling tape-recording areal densities to 100 Gb/in2," 2008 IBM, IBM Journal of Research & Development, vol. 52, No. 4/5, Jul./Sep. 2008, pp. 513-527.
Beuch, We, "Magnetic Read Write Head Carriage Adjustment Procedure," IPCOM000071116D, Dec. 1, 1978, pp. 1-3.
Biskeborn et al., "2.4 Tape Head Technology," International Magnetic Tape Storage Roadmap, May 2012, pp. 107-128.
Cherubini et al., "Control Methods in Data-Storage Systems," IEEE Transactions on Control Systems Technology, vol. 20, Issue 2, Mar. 2012, pp. 296-322.
Childers et al., "Six orders of magnitude in linear tape technology: The one-terabyte project," IBM Journal of Research & Development, vol. 47, No. 4, Jul. 2003, pp. 471-482.
Ditzel et al., "A Computer Method for the Automatic Reduction of Spectroscopic Data," Applied Optics, vol. 6, No. 12, Dec. 1967, pp. 2085-2090.
Goldade et al., "Tape edge study in a linear tape drive with single-flanged guides," Journal of Magnetism and Magnetic Materials, vol. 271, 2004, pp. 409-430.
Non-Final Office Action from U.S. Appl. No. 13/875,226, dated Sep. 15, 2014.
Non-Final Office Action from U.S. Appl. No. 13/875,230, dated Sep. 18, 2014.
Non-Final Office Action from U.S. Appl. No. 13/875,231, dated Sep. 16, 2014.
Non-Final Office Action from U.S. Appl. No. 13/890,155, dated Oct. 23, 2014.
Non-Final Office Action from U.S. Appl. No. 14/028,444, dated Feb. 26, 2015.
Non-Final Office Action from U.S. Appl. No. 14/527,722, dated Mar. 6, 2015.
Notice of Allowance from U.S. Appl. No. 14/019,405, dated Apr. 10, 2014.
Notice of Allowance from U.S. Appl. No. 14/108,229, dated Dec. 4, 2014.
Notice of Allowance from U.S. Appl. No. 13/875,230, dated Jan. 21, 2015.
Notice of Allowance from U.S. Appl. No. 14/316,696, dated Jul. 18, 2014.
Notice of Allowance from U.S. Appl. No. 13/972,790, dated Mar. 20, 2014.
Restriction Requirement from U.S. Appl. No. 13/875,231, dated Jul. 22, 2014.
Restriction Requirement from U.S. Appl. No. 13/890,155, dated Jun. 25, 2014.
Restriction Requirement from U.S. Appl. No. 13/875,230, dated Jul. 10, 2014.
Restriction Requirement from U.S. Appl. No. 13/875,226, dated Jun. 26, 2014.
Restriction Requirement from U.S. Appl. No. 14/028,444, dated Oct. 9, 2014.
Supplemental Notice of Allowability from U.S. Appl. No. 14/019,405, dated Jul. 14, 2014.
Supplemental Notice of Allowability from U.S. Appl. No. 14/316,696, dated Sep. 26, 2014.
Supplemental Notice of Allowability from U.S. Appl. No. 14/316,696, dated Oct. 23, 2014.
Supplemental Notice of Allowability from U.S. Appl. No. 14/316,696, dated Sep. 4, 2014.
Wright, A. E., "Effects of Operating Parameters on Lateral Tape Motion for Magnetic Tape in an Advanced Linear Tape Drive," Thesis, The Ohio State University, 2006, pp. 1-104.
Biskeborn et al., U.S. Appl. No. 13/875,230, filed May 1, 2013.
Biskeborn et al., U.S. Appl. No. 13/875,231, filed May 1, 2013.
Biskeborn et al., U.S. Appl. No. 13/972,790, filed Aug. 21, 2013.
Biskeborn et al., U.S. Appl. No. 14/019,405, filed Sep. 5, 2013.
Biskeborn et al., U.S. Appl. No. 14/105,082, filed Dec. 12, 2013.
Biskeborn et al., U.S. Appl. No. 14/316,696, filed Jun. 26, 2014.
Biskeborn et al., U.S. Appl. No. 14/527,722, filed Oct. 29, 2014.
Biskeborn et al., U.S. Appl. No. 13/875,226, filed May 1, 2013.
Biskeborn et al., U.S. Appl. No. 13/890,155, filed May 8, 2013.
Biskeborn et al., U.S. Appl. No. 14/028,444, filed Sep. 16, 2013.
Biskeborn et al., U.S. Appl. No. 14/108,229, filed Dec. 16, 2013.
International Search Report and Written Opinion from PCT Application No. PCT/IB2014/060706, dated Jan. 21, 2015.
Final Office Action from U.S. Appl. No. 13/875,226, dated Mar. 27, 2015.
Final Office Action from U.S. Appl. No. 13/875,231, dated Mar. 25, 2015.
Ex Parte Quayle from U.S. Appl. No. 13/890,155, dated Apr. 10, 2015.
Notice of Allowance from U.S. Appl. No. 14/105,082, dated Mar. 30, 2015.
Notice of Allowance from U.S. Appl. No. 14/645,350, dated Apr. 16, 2015.
Supplemental Notice of Allowability from U.S. Appl. No. 14/105,082, dated May 7, 2015.
Biskeborn et al., U.S. Appl. No. 14/645,350, filed Mar. 11, 2015.
Notice of Allowance from U.S. Appl. No. 13/875,230, dated May 6, 2015.
Supplemental Notice of Allowability from U.S. Appl. No. 13/972,790, dated Jul. 8, 2014.
Supplemental Notice of Allowability from U.S. Appl. No. 13/875,230, dated May 28, 2015.
Supplemental Notice of Allowance from U.S. Appl. No. 14/934,023, dated Mar. 11, 2016.
Notice of Allowance from U.S. Appl. No. 13/875,231, dated Mar. 14, 2016.
Examination Report from United Kingdom Application No. GB1520855.6, dated Dec. 24, 2015.
Supplemental Notice of Allowance from U.S. Appl. No. 13/875,231, dated Mar. 29, 2016.

(56) References Cited

OTHER PUBLICATIONS

Supplemental Notice of Allowance from U.S. Appl. No. 14/934,023, dated Apr. 8, 2016.
Non-Final Office Action from U.S. Appl. No. 14/860,522, dated Apr. 7, 2016.
Non-Final Office Action from U.S. Appl. No. 14/924,622, dated May 10, 2016.
Supplemental Notice of Allowance from U.S. Appl. No. 14/645,350, dated Sep. 23, 2015.
Biskeborn et al., U.S. Appl. No. 14/860,607, filed Sep. 21, 2015.
Biskeborn et al., U.S. Appl. No. 14/860,644, filed Sep. 21, 2015.
Biskeborn et al., U.S. Appl. No. 14/860,656, filed Sep. 21, 2015.
Supplemental Notice of Allowability from U.S. Appl. No. 14/645,350, dated Oct. 21, 2015.
Notice of Allowance from U.S. Appl. No. 14/527,722, dated Oct. 14, 2015.
Notice of Allowance from U.S. Appl. No. 13/890,155, dated Oct. 28, 2015.
Biskeborn et al., U.S. Appl. No. 14/924,543, filed Oct. 27, 2015.
Notice of Allowance from U.S. Appl. No. 13/875,231, dated Jun. 1, 2016.
Bui et al., U.S. Appl. No. 14/334,395, filed Jul. 17, 2014.
Notice of Allowance from U.S. Appl. No. 14/334,395, dated Oct. 6, 2014.
Advisory Action from U.S. Appl. No. 13/875,231, dated Jun. 1, 2015.
Non-Final Office Action from U.S. Appl. No. 14/574,278, dated May 15, 2015.
Advisory Action from U.S. Appl. No. 13/875,226, dated Jun. 17, 2015.
Non-Final Office Action from U.S. Appl. No. 13/875,231, dated Jul. 2, 2015.
Notice of Allowance from U.S. Appl. No. 13/890,155, dated Jul. 15, 2015.
Notice of Allowance from U.S. Appl. No. 13/875,226, dated Jul. 31, 2015.
Supplemental Notice of Allowance from U.S. Appl. No. 13/875,230, dated Aug. 4, 2015.
Final Office Action from U.S. Appl. No. 14/527,722, dated Aug. 4, 2015.
Notice of Allowance from U.S. Appl. No. 14/028,444, dated Aug. 5, 2015.
Supplemental Notice of Allowance from U.S. Appl. No. 14/105,082, dated Aug. 25, 2015.
Notice of Allowance from U.S. Appl. No. 14/105,082, dated Aug. 14, 2015.
Supplemental Notice of Allowance from U.S. Appl. No. 13/875,226, dated Aug. 20, 2015.
Notice of Allowance from U.S. Appl. No. 14/645,350, dated Sep. 9, 2015.
Supplemental Notice of Allowance from U.S. Appl. No. 14/028,444, dated Sep. 8, 2015.
Statement of Relevance of Non-Translated Foreign Document WO2007093107, dated Aug. 23, 2007.
Supplemental Notice of Allowance from U.S. Appl. No. 13/875,226, dated Sep. 16, 2015.
Notice of Allowance from U.S. Appl. No. 14/934,023, dated Feb. 22, 2016.
Supplemental Notice of Allowance from U.S. Appl. No. 13/875,231, dated Jun. 20, 2016.
Non-Final Office Action from U.S. Appl. No. 14/852,400, dated Jun. 30, 2016.
Supplemental Notice of Allowance from U.S. Appl. No. 13/875,231, dated Aug. 10, 2016.
Final Office Action from U.S. Appl. No. 14/860,522, dated Sep. 15, 2016.
Notice of Allowance from U.S. Appl. No. 14/924,622, dated Oct. 27, 2016.
Notice of Allowance from U.S. Appl. No. 14/860,522, dated Nov. 21, 2016.
Final Office Action from U.S. Appl. No. 14/852,400, dated Jan. 5, 2017.
Supplemental Notice of Allowance from U.S. Appl. No. 14/860,522, dated Jan. 20, 2017.
Supplemental Notice of Allowance from U.S. Appl. No. 14/924,622, dated Jan. 23, 2017.
Notice of Allowance from U.S. Appl. No. 14/852,400, dated Mar. 21, 2017.
Supplemental Notice of Allowance from U.S. Appl. No. 14/852,400, dated Apr. 4, 2017.

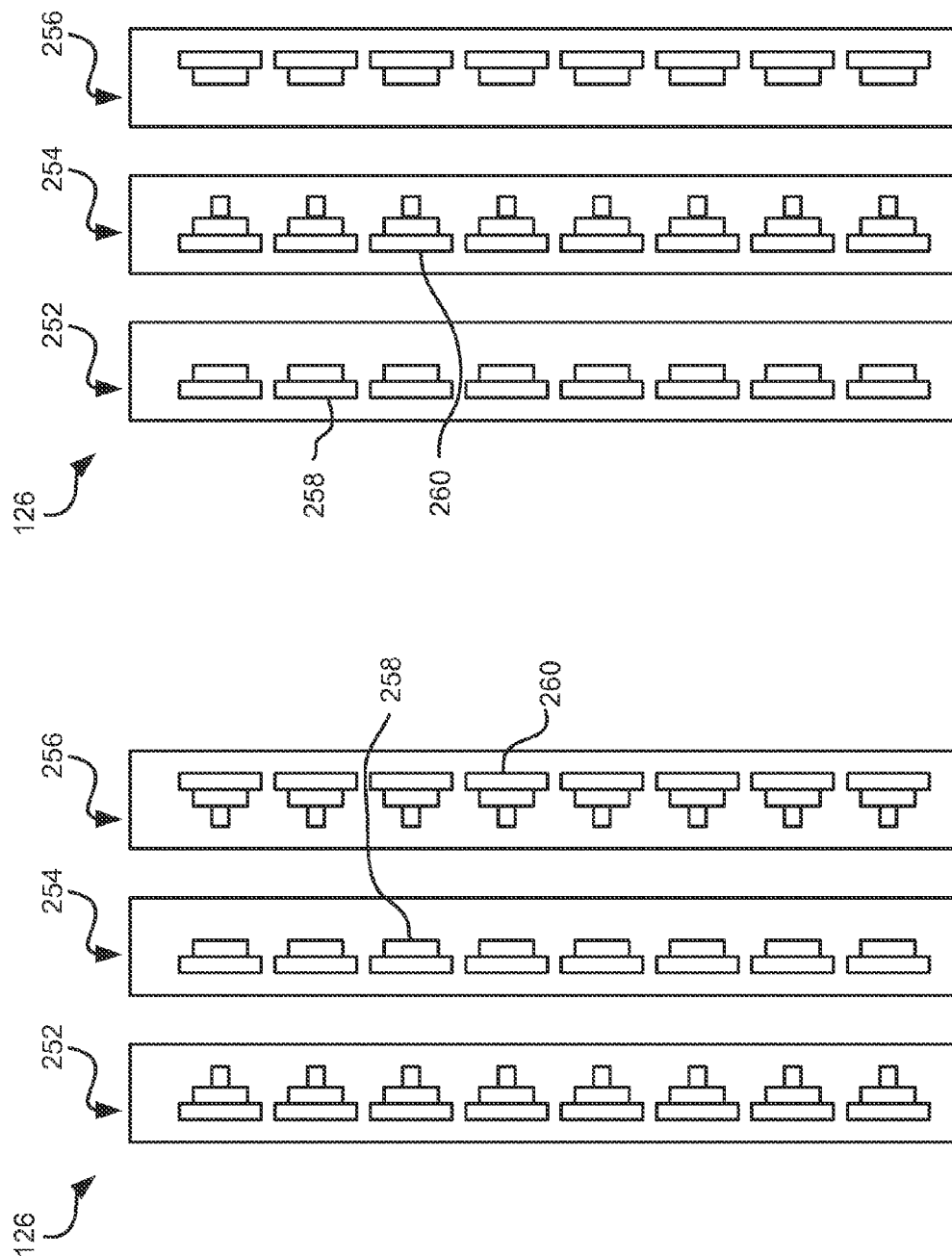

MAGNETIC HEAD AND SYSTEM HAVING OFFSET ARRAYS

BACKGROUND

The present invention relates to data storage systems, and more particularly, this invention relates to a magnetic head and system implementing the same, where the head has offset arrays.

In magnetic storage systems, data is read from and written onto magnetic recording media utilizing magnetic transducers. Data is written on the magnetic recording media by moving a magnetic recording transducer to a position over the media where the data is to be stored. The magnetic recording transducer then generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, that goal has led to increasing the track and linear bit density on recording tape, and decreasing the thickness of the magnetic tape medium. However, the development of small footprint, higher performance tape drive systems has created various problems in the design of a tape head assembly for use in such systems.

In a tape drive system, magnetic tape is moved over the surface of the tape head at high speed. Usually the tape head is designed to minimize the spacing between the head and the tape. The spacing between the magnetic head and the magnetic tape is crucial so that the recording gaps of the transducers, which are the source of the magnetic recording flux, are in near contact with the tape to effect writing sharp transitions, and so that the read element is in near contact with the tape to provide effective coupling of the magnetic field from the tape to the read element.

The quantity of data stored on a magnetic tape may be increased by increasing the number of data tracks across the tape. More tracks are made possible by reducing feature sizes of the readers and writers, such as by using thin-film fabrication techniques and MR sensors. However, for various reasons, the feature sizes of readers and writers cannot be arbitrarily reduced, and so factors such as lateral tape motion transients and tape lateral expansion and contraction (e.g., perpendicular to the direction of tape travel) must be balanced with reader/writer sizes that provide acceptable written tracks and readback signals. One issue limiting areal density is misregistration caused by tape lateral expansion and contraction. Tape width can vary by up to about 0.1% due to expansion and contraction caused by changes in humidity, tape tension, temperature, aging etc. This is often referred to as tape dimensional stability (TDS).

If the tape is written in one environment and then read back in another, the TDS may prevent the spacing of the tracks on the tape from precisely matching the spacing of the reading elements during readback. In current products, the change in track spacing due to TDS is small compared to the size of the written tracks and is part of the tracking budget that is considered when designing a product. As the tape capacity increases over time, tracks are becoming smaller and TDS is becoming an increasingly larger portion of the tracking budget and this is a limiting factor for growing areal density.

SUMMARY

In one general embodiment, a computer program product for orienting a head includes a computer readable storage medium having program instructions embodied therewith. The program instructions are readable and/or executable by a controller to cause the controller to: determine, by the controller, a desired pitch for transducers for reading and/or writing to a magnetic tape; and cause, by the controller, a mechanism to orient a head to achieve the desired pitch, the head having at least two opposing modules generally aligned with each other in an intended direction of tape travel thereacross, positions of the two modules being fixed relative to each other, each module having an array of the transducers. An axis of each array is defined between opposite ends thereof. The array of a first of the modules is offset from the array of a second of the modules in a first direction parallel to the axis of the array of the second module such that the transducers of the first module are about aligned with the transducers of the second module in the intended direction of tape travel thereacross when the axes are oriented at an angle greater than 0.2° relative to a line oriented perpendicular to the intended direction of tape travel.

This embodiment may be implemented in a magnetic data storage system such as a tape drive system, which may include a magnetic head, a drive mechanism for passing a magnetic medium (e.g., recording tape) over the magnetic head, and a controller electrically coupled to the magnetic head.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a partial tape bearing surface view of a magnetic head having a write-read-write configuration.

FIG. 4 is a partial tape bearing surface view of a magnetic head having a read-write-read configuration.

DETAILED DESCRIPTION

Figure 1A:
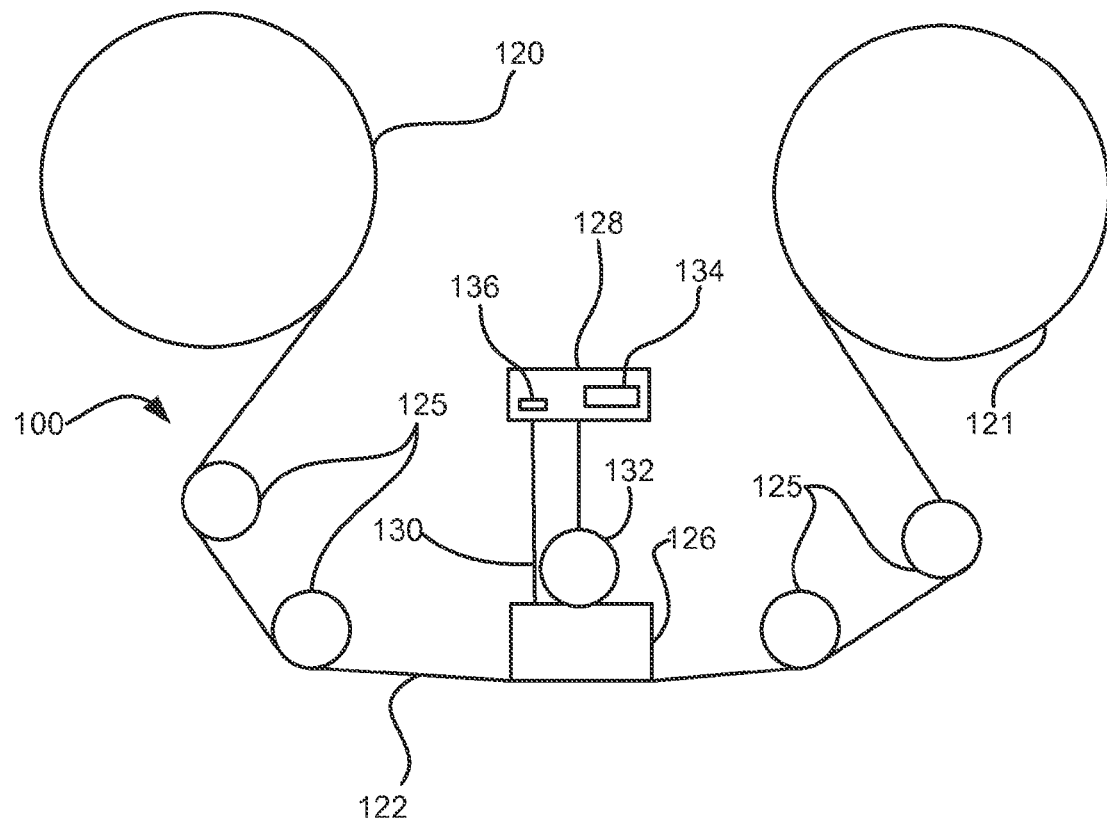
FIG. 1A is a schematic diagram of a simplified tape drive system according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof.

In one general embodiment, an apparatus includes at least two modules, each of the modules having an array of transducers, wherein the at least two modules are fixed relative to each other, wherein an axis of each array is defined between opposite ends thereof, wherein the axes of the arrays are oriented about parallel to each other, wherein the array of a first of the modules is offset from the array of a second of the modules in a first direction parallel to the axis of the array of the second module such that the transducers of the first module are about aligned with the transducers of the second module in an intended direction of tape travel thereacross when the axes are oriented at an angle greater than 0.2° relative to a line oriented perpendicular to the intended direction of tape travel thereacross; and a mechanism for orienting the modules to control a transducer pitch presented to a tape.

In another general embodiment, an apparatus includes at least two modules, each of the modules having an array of transducers, a drive mechanism for passing a magnetic medium over the modules; a mechanism for orienting the modules to control a transducer pitch presented to a tape; and a controller configured to control the mechanism for orienting the modules based on a state of expansion of the tape, wherein the at least two modules are fixed relative to each other, wherein an axis of each array is defined between opposite ends thereof, wherein the axes of the arrays are oriented about parallel to each other, wherein the axes are oriented at an angle greater than 0.2° relative to a line oriented perpendicular to an intended direction of tape travel thereacross, wherein the array of a first of the modules is offset from the array of a second of the modules in a first direction parallel to the axis of the array of the second module such that the transducers of the first module are about aligned with the transducers of the second module in the intended direction of tape travel thereacross.

In yet another general embodiment, a computer program product for orienting a head includes a computer readable storage medium having program code embodied therewith. The program code is readable/executable by a controller to: determine, by the controller, a desired pitch for transducers for reading and/or writing to a magnetic tape; and cause a mechanism to orient a head to achieve the desired pitch, the head having at least two opposing modules generally aligned with each other in an intended direction of tape travel thereacross, positions of the two modules being fixed relative to each other, each module having an array of the transducers. An axis of each array is defined between opposite ends thereof. The array of a first of the modules is offset from the array of a second of the modules in a first direction parallel to the axis of the array of the second module such that the transducers of the first module are about aligned with the transducers of the second module in the intended direction of tape travel thereacross when the axes are oriented at an angle greater than 0.2° relative to a line oriented perpendicular to the intended direction of tape travel.

FIG. 1A illustrates a simplified tape drive 100 of a tape-based data storage system, which may be employed in the context of the present invention. While one specific implementation of a tape drive is shown in FIG. 1A, it should be noted that the embodiments described herein may be implemented in the context of any type of tape drive system.

As shown, a tape supply cartridge 120 and a take-up reel 121 are provided to support a tape 122. One or more of the reels may form part of a removable cartridge and are not necessarily part of the system 100. The tape drive, such as that illustrated in FIG. 1A, may further include drive motor(s) to drive the tape supply cartridge 120 and the take-up reel 121 to move the tape 122 over a tape head 126 of any type. Such head may include an array of readers, writers, or both.

Guides 125 guide the tape 122 across the tape head 126. Such tape head 126 is in turn coupled to a controller 128 via a cable 130. The controller 128, may be or include a processor and/or any logic for controlling any subsystem of the drive 100. For example, the controller 128 typically controls head functions such as servo following, data writing, data reading, etc. The controller 128 may operate under logic known in the art, as well as any logic disclosed herein. The controller 128 may be coupled to a memory 136 of any known type, which may store instructions executable by the controller 128. Moreover, the controller 128 may be configured and/or programmable to perform or control some or all of the methodology presented herein. Thus, the controller may be considered configured to perform various operations by way of logic programmed into a chip; software, firmware, or other instructions being available to a processor; etc. and combinations thereof.

The cable 130 may include read/write circuits to transmit data to the head 126 to be recorded on the tape 122 and to receive data read by the head 126 from the tape 122. An actuator 132 controls position of the head 126 relative to the tape 122.

An interface 134 may also be provided for communication between the tape drive 100 and a host (integral or external) to send and receive the data and for controlling the operation of the tape drive 100 and communicating the status of the tape drive 100 to the host, all as will be understood by those of skill in the art.

Figure 1B:
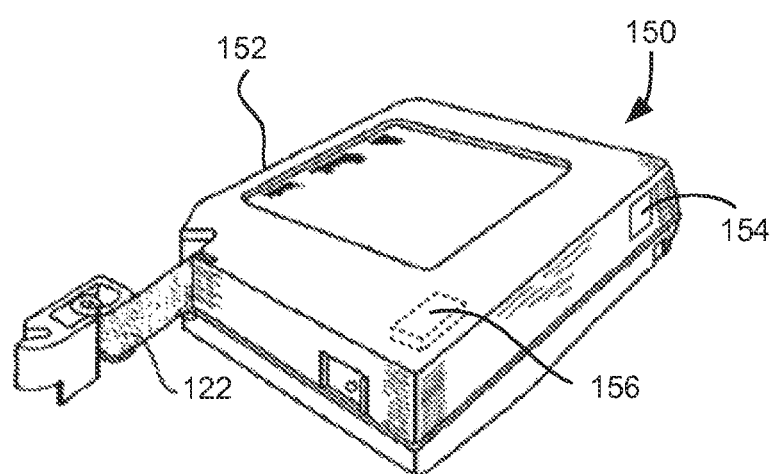
FIG. 1B is a schematic diagram of a tape cartridge according to one embodiment.

FIG. 1B illustrates an exemplary tape cartridge 150 according to one embodiment. Such tape cartridge 150 may be used with a system such as that shown in FIG. 1A. As shown, the tape cartridge 150 includes a housing 152, a tape 122 in the housing 152, and a nonvolatile memory 156 coupled to the housing 152. In some approaches, the nonvolatile memory 156 may be embedded inside the housing 152, as shown in FIG. 1B. In more approaches, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a Flash memory device, ROM device, etc., embedded into or coupled to the inside or outside of the tape cartridge 150. The nonvolatile memory is accessible by the tape drive and the tape operating software (the driver software), and/or other device.

Figure 2:
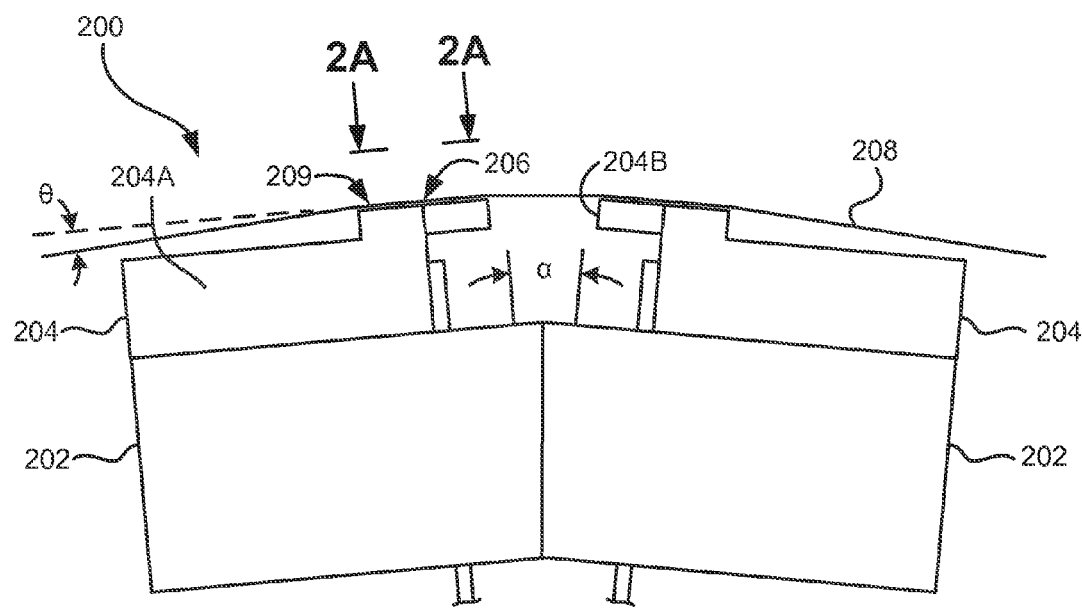
FIG. 2 illustrates a side view of a flat-lapped, bi-directional, two-module magnetic tape head according to one embodiment.

By way of example, FIG. 2 illustrates a side view of a flat-lapped, bi-directional, two-module magnetic tape head 200 which may be implemented in the context of the present invention. As shown, the head includes a pair of bases 202, each equipped with a module 204, and fixed at a small angle α with respect to each other. The bases may be "U-beams" that are adhesively coupled together. Each module 204 includes a substrate 204A and a closure 204B with a thin film portion, commonly referred to as a "gap" in which the readers and/or writers 206 are formed. In use, a tape 208 is moved over the modules 204 along a media (tape) bearing surface 209 in the manner shown for reading and writing data on the tape 208 using the readers and writers. The wrap angle θ of the tape 208 at edges going onto and exiting the flat media support surfaces 209 are usually between about 0.1 degree and about 5 degrees.

The substrates 204A are typically constructed of a wear resistant material, such as a ceramic. The closures 204B made of the same or similar ceramic as the substrates 204A.

The readers and writers may be arranged in a piggyback or merged configuration. An illustrative piggybacked configuration comprises a (magnetically inductive) writer transducer on top of (or below) a (magnetically shielded) reader transducer (e.g., a magnetoresistive reader, etc.), wherein the poles of the writer and the shields of the reader are generally separated. An illustrative merged configuration comprises one reader shield in the same physical layer as one writer pole (hence, "merged"). The readers and writers may also be arranged in an interleaved configuration. Alternatively, each array of channels may be readers or writers only. Any of these arrays may contain one or more servo track readers for reading servo data on the medium.

Figure 2A:
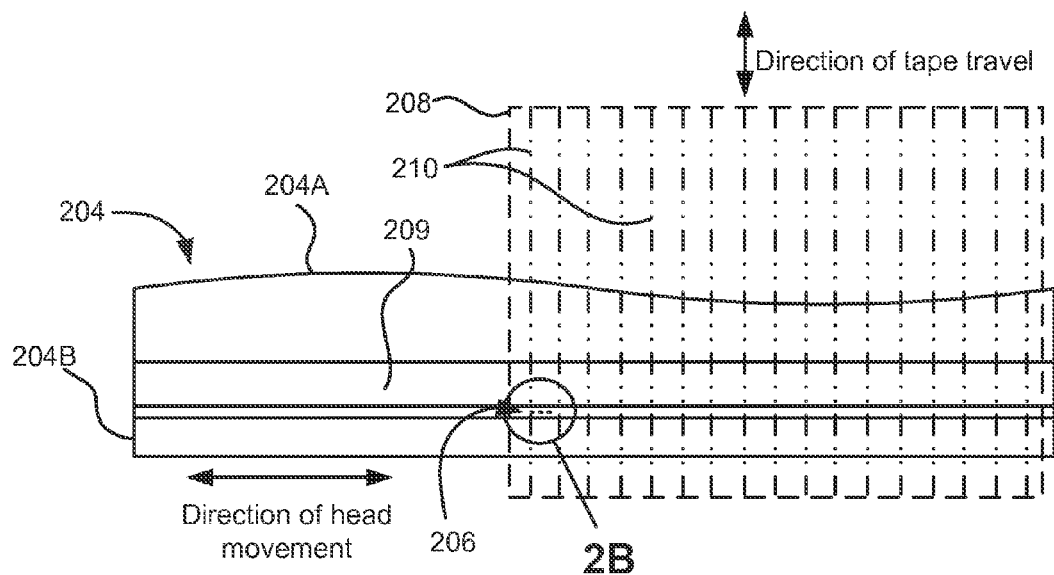
FIG. 2A is a tape bearing surface view taken from Line 2A of FIG. 2.

FIG. 2A illustrates the tape bearing surface 209 of one of the modules 204 taken from Line 2A of FIG. 2. A representative tape 208 is shown in dashed lines. The module 204 is preferably long enough to be able to support the tape as the head steps between data bands.

In this example, the tape 208 includes 4 to 22 data bands, e.g., with 8 data bands and 9 servo tracks 210, as shown in FIG. 2A on a one-half inch wide tape 208. The data bands are defined between servo tracks 210. Each data band may include a number of data tracks, for example 1024 data tracks (not shown). During read/write operations, the readers and/or writers 206 are positioned to specific track positions within one of the data bands. Outer readers, sometimes called servo readers, read the servo tracks 210. The servo signals are in turn used to keep the readers and/or writers 206 aligned with a particular set of tracks during the read/write operations.

Figure 2B:
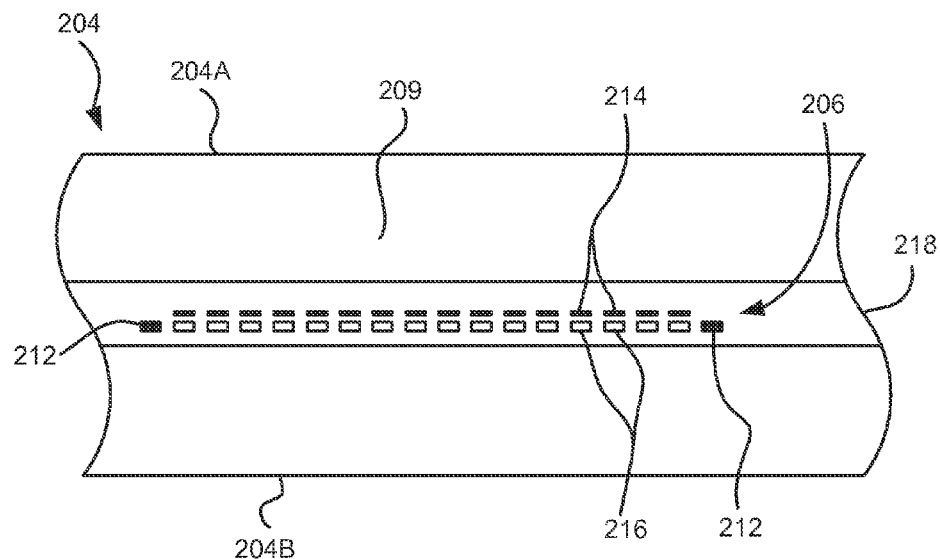
FIG. 2B is a detailed view taken from Circle 2B of FIG. 2A.

FIG. 2B depicts a plurality of readers and/or writers 206 formed in a gap 218 on the module 204 in Circle 2B of FIG. 2A. As shown, the array of readers and writers 206 includes, for example, 16 writers 214, 16 readers 216 and two servo readers 212, though the number of elements may vary. Illustrative embodiments include 8, 16, 32, 40, and 64 active readers and/or writers 206 per array, and alternatively interleaved designs having odd numbers of reader or writers such as 17, 25, 33, etc. An illustrative embodiment includes 32 readers per array and/or 32 writers per array, where the actual number of transducer elements could be greater, e.g., 33, 34, etc. This allows the tape to travel more slowly, thereby reducing speed-induced tracking and mechanical difficulties and/or execute fewer "wraps" to fill or read the tape. While the readers and writers may be arranged in a piggyback configuration as shown in FIG. 2B, the readers 216 and writers 214 may also be arranged in an interleaved configuration. Alternatively, each array of readers and/or writers 206 may be readers or writers only, and the arrays may contain one or more servo readers 212. As noted by considering FIGS. 2 and 2A-B together, each module 204 may include a complementary set of readers and/or writers 206 for such things as bi-directional reading and writing, read-while-write capability, backward compatibility, etc.

Figure 2C:
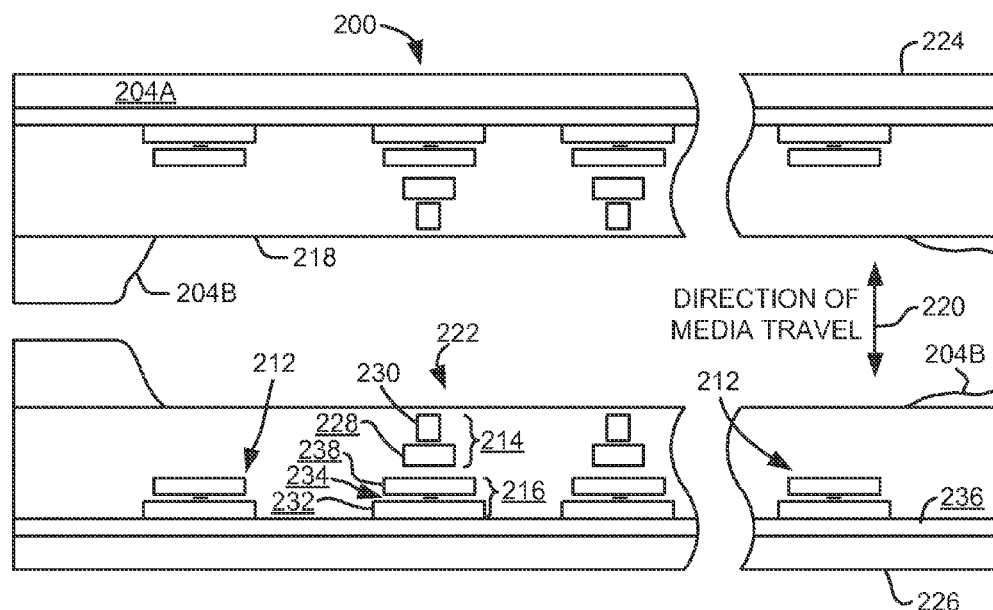
FIG. 2C is a detailed view of a partial tape bearing surface of a pair of modules.

FIG. 2C shows a partial tape bearing surface view of complimentary modules of a magnetic tape head 200 according to one embodiment. In this embodiment, each module has a plurality of read/write (R/W) pairs in a piggyback configuration formed on a common substrate 204A and an optional electrically insulative layer 236. The writers, exemplified by the write head 214 and the readers, exemplified by the read head 216, are aligned parallel to a direction of travel of a tape medium thereacross to form an R/W pair, exemplified by the R/W pair 222.

Several R/W pairs 222 may be present, such as 8, 16, 32 pairs, etc. The R/W pairs 222 as shown are linearly aligned in a direction generally perpendicular to a direction of tape travel thereacross. However, the pairs may also be aligned diagonally, etc. Servo readers 212 are positioned on the outside of the array of R/W pairs, the function of which is well known.

Generally, the magnetic tape medium moves in either a forward or reverse direction as indicated by arrow 220. The magnetic tape medium and head assembly 200 operate in a transducing relationship in the manner well-known in the art. The piggybacked MR head assembly 200 includes two thin-film modules 224 and 226 of generally identical construction.

Modules 224 and 226 are joined together with a space present between closures 204B thereof (partially shown) to form a single physical unit to provide read-while-write capability by activating the writer of the leading module and reader of the trailing module aligned with the writer of the leading module parallel to the direction of tape travel relative thereto. When a module 224, 226 of a piggyback head 200 is constructed, layers are formed in the gap 218 created above an electrically conductive substrate 204A (partially shown), e.g., of AlTiC, in generally the following order for the R/W pairs 222: an insulating layer 236, a first shield 232 typically of an iron alloy such as NiFe (-), CZT or Al—Fe—Si (Sendust), a sensor 234 for sensing a data track on a magnetic medium, a second shield 238 typically of a nickel-iron alloy (e.g., ~80/20 at % NiFe, also known as permalloy), first and second writer pole tips 228, 230, and a coil (not shown). The sensor may be of any known type, including those based on MR, GMR, AMR, tunneling magnetoresistance (TMR), etc.

The first and second writer poles 228, 230 may be fabricated from high magnetic moment materials such as ~45/55 NiFe. Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc.

The configuration of the tape head 126 according to one embodiment includes multiple modules, preferably three or more. In a write-read-write (W-R-W) head, outer modules for writing flank one or more inner modules for reading. Referring to FIG. 3, depicting a W-R-W configuration, the outer modules 252, 256 each include one or more arrays of writers 260. The inner module 254 of FIG. 3 includes one or more arrays of readers 258 in a similar configuration. Variations of a multi-module head include a R-W-R head (FIG. 4), a R-R-W head, a W-W-R head, etc. In yet other variations, one or more of the modules may have read/write pairs of transducers. Moreover, more than three modules may be present. In further approaches, two outer modules may flank two or more inner modules, e.g., in a W-R-R-W, a R-W-W-R arrangement, etc. For simplicity, a W-R-W head is used primarily herein to exemplify embodiments of the present invention. One skilled in the art apprised with the teachings herein will appreciate how permutations of the present invention would apply to configurations other than a W-R-W configuration.

Figure 5:
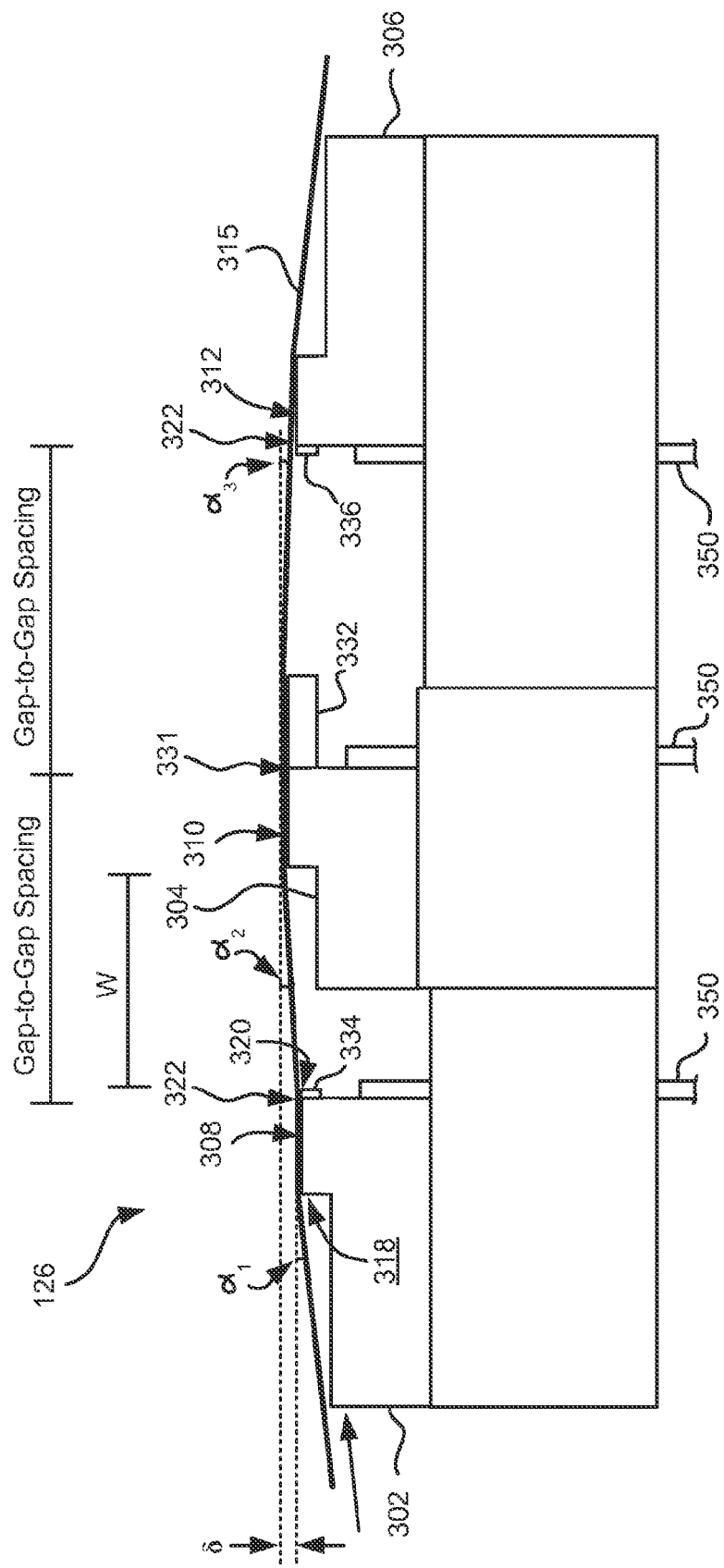
FIG. 5 is a side view of a magnetic tape head with three modules according to one embodiment where the modules all generally lie along about parallel planes.

FIG. 5 illustrates a magnetic head 126 according to one embodiment of the present invention that includes first, second and third modules 302, 304, 306 each having a tape bearing surface 308, 310, 312 respectively, which may be flat, contoured, etc. Note that while the term "tape bearing surface" appears to imply that the surface facing the tape 315 is in physical contact with the tape bearing surface, this is not necessarily the case. Rather, only a portion of the tape may be in contact with the tape bearing surface, constantly or intermittently, with other portions of the tape riding (or "flying") above the tape bearing surface on a layer of air, sometimes referred to as an "air bearing". The first module 302 will be referred to as the "leading" module as it is the first module encountered by the tape in a three module design for tape moving in the indicated direction. The third module 306 will be referred to as the "trailing" module. The trailing module follows the middle module and is the last module seen by the tape in a three module design. The leading and trailing modules 302, 306 are referred to collectively as outer modules. Also note that the outer modules 302, 306 will alternate as leading modules, depending on the direction of travel of the tape 315.

Figure 6:
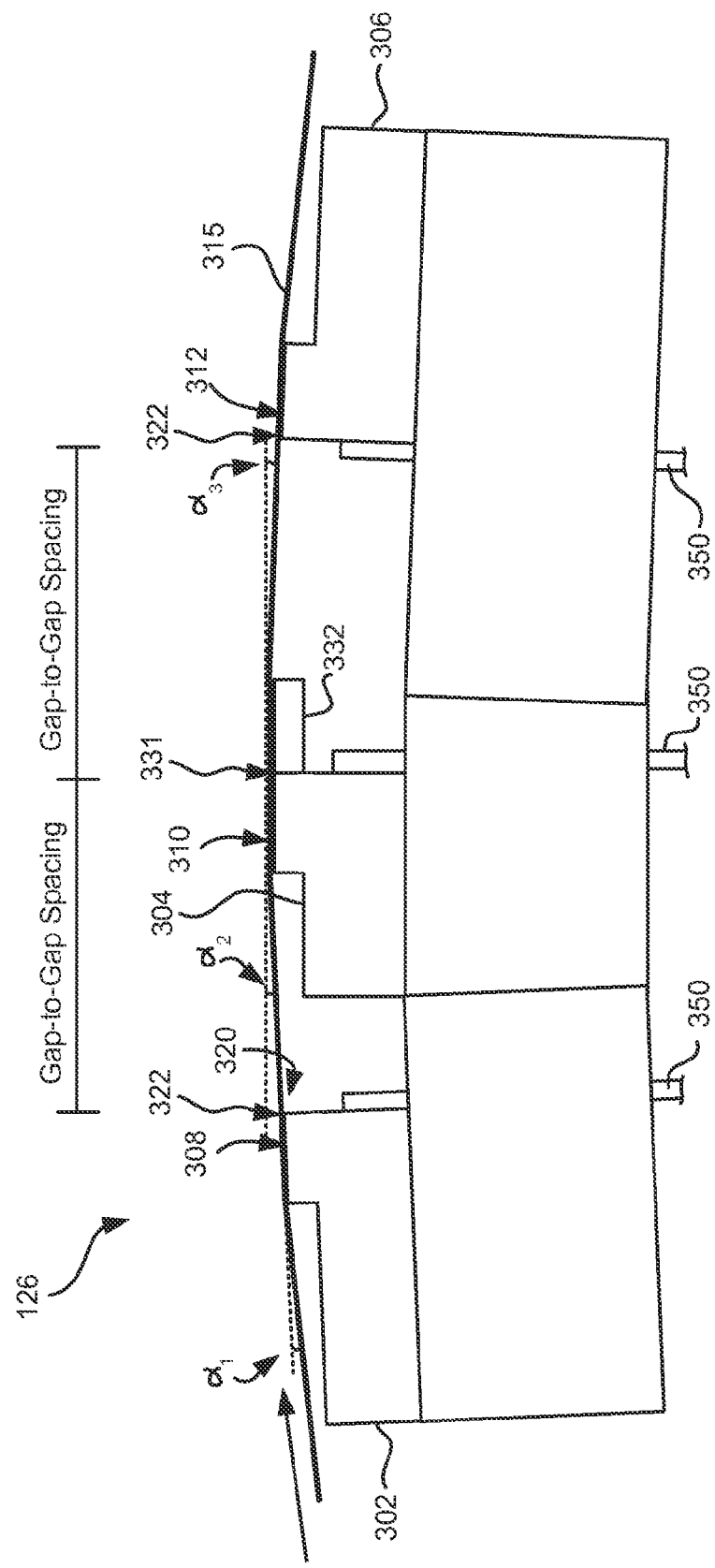
FIG. 6 is a side view of a magnetic tape head with three modules in a tangent (angled) configuration.

In one embodiment, the tape bearing surfaces 308, 310, 312 of the first, second and third modules 302, 304, 306 lie on about parallel planes (which is meant to include parallel and nearly parallel planes, e.g., between parallel and tangential as in FIG. 6), and the tape bearing surface 310 of the second module 304 is above the tape bearing surfaces 308, 312 of the first and third modules 302, 306. As described below, this has the effect of creating the desired wrap angle $\alpha_2$ of the tape relative to the tape bearing surface 310 of the second module 304.

Where the tape bearing surfaces 308, 310, 312 lie along parallel or nearly parallel yet offset planes, intuitively, the tape should peel off of the tape bearing surface 308 of the leading module 302. However, the vacuum created by the skiving edge 318 of the leading module 302 has been found by experimentation to be sufficient to keep the tape adhered to the tape bearing surface 308 of the leading module 302. The trailing edge 320 of the leading module 302 (the end from which the tape leaves the leading module 302) is the approximate reference point which defines the wrap angle $\alpha_2$ over the tape bearing surface 310 of the second module 304. The tape stays in close proximity to the tape bearing surface until close to the trailing edge 320 of the leading module 302. Accordingly, read and/or write elements 322 may be located near the trailing edges of the outer modules 302, 306. These embodiments are particularly adapted for write-read-write applications.

A benefit of this and other embodiments described herein is that, because the outer modules 302, 306 are fixed at a determined offset from the second module 304, the inner wrap angle $\alpha_2$ is fixed when the modules 302, 304, 306 are coupled together or are otherwise fixed into a head. The inner wrap angle $\alpha_2$ is approximately $\tan^{-1}(\delta/W)$ where $\delta$ is the height difference between the planes of the tape bearing surfaces 308, 310 and W is the width between the opposing ends of the tape bearing surfaces 308, 310. An illustrative inner wrap angle $\alpha_2$ is in a range of about 0.5° to about 1.1°, though can be any angle required by the design.

Beneficially, the inner wrap angle $\alpha_2$ may be set slightly less on the side of the module 304 receiving the tape (leading edge) than the inner wrap angle $\alpha_3$ on the trailing edge, as the tape 315 rides above the trailing module 306. This difference is generally beneficial as a smaller $\alpha_3$ tends to oppose what has heretofore been a steeper exiting effective wrap angle.

Note that the tape bearing surfaces 308, 312 of the outer modules 302, 306 are positioned to achieve a negative wrap angle at the trailing edge 320 of the leading module 302. This is generally beneficial in helping to reduce friction due to contact with the trailing edge 320, provided that proper consideration is given to the location of the crowbar region that forms in the tape where it peels off the head. This negative wrap angle also reduces flutter and scrubbing damage to the elements on the leading module 302. Further, at the trailing module 306, the tape 315 flies over the tape bearing surface 312 so there is virtually no wear on the elements when tape is moving in this direction. Particularly, the tape 315 entrains air and so will not significantly ride on the tape bearing surface 312 of the third module 306 (some contact may occur). This is permissible, because the leading module 302 is writing while the trailing module 306 is idle.

Writing and reading functions are performed by different modules at any given time. In one embodiment, the second module 304 includes a plurality of data and optional servo readers 331 and no writers. The first and third modules 302, 306 include a plurality of writers 322 and no readers, with the exception that the outer modules 302, 306 may include optional servo readers. The servo readers may be used to position the head during reading and/or writing operations. The servo reader(s) on each module are typically located towards the end of the array of readers or writers.

By having only readers or side by side writers and servo readers in the gap between the substrate and closure, the gap length can be substantially reduced. Typical heads have piggybacked readers and writers, where the writer is formed above each reader. A typical gap is 25-35 microns. However, irregularities on the tape may tend to droop into the gap and create gap erosion. Thus, the smaller the gap is the better. The smaller gap enabled herein exhibits fewer wear related problems.

In some embodiments, the second module 304 has a closure, while the first and third modules 302, 306 do not have a closure. Where there is no closure, preferably a hard coating is added to the module. One preferred coating is diamond-like carbon (DLC).

In the embodiment shown in FIG. 5, the first, second, and third modules 302, 304, 306 each have a closure 332, 334, 336, which extends the tape bearing surface of the associated module, thereby effectively positioning the read/write elements away from the edge of the tape bearing surface. The closure 332 on the second module 304 can be a ceramic closure of a type typically found on tape heads. The closures 334, 336 of the first and third modules 302, 306, however, may be shorter than the closure 332 of the second module 304 as measured parallel to a direction of tape travel over the respective module. This enables positioning the modules closer together. One way to produce shorter closures 334, 336 is to lap the standard ceramic closures of the second module 304 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 334, 336 or no closures on the outer modules 302, 306, the write-to-read gap spacing can be reduced to less than about 1 mm, e.g., about 0.75 mm, or 50% less than standard LTO tape head spacing. The open space between the modules 302, 304, 306 can still be set to approximately 0.5 to 0.6 mm, which in some embodiments is ideal for stabilizing tape motion over the second module 304.

Depending on tape tension and stiffness, it may be desirable to angle the tape bearing surfaces of the outer modules relative to the tape bearing surface of the second module. FIG. 6 illustrates an embodiment where the modules 302, 304, 306 are in a tangent or nearly tangent (angled) configuration. Particularly, the tape bearing surfaces of the outer modules 302, 306 are about parallel to the tape at the desired wrap angle $\alpha_2$ of the second module 304. In other words, the planes of the tape bearing surfaces 308, 312 of the outer modules 302, 306 are oriented at about the desired wrap angle $\alpha_2$ of the tape 315 relative to the second module 304. The tape will also pop off of the trailing module 306 in this embodiment, thereby reducing wear on the elements in the trailing module 306. These embodiments are particularly useful for write-read-write applications. Additional aspects of these embodiments are similar to those given above.

Typically, the tape wrap angles may be set about midway between the embodiments shown in FIGS. 5 and 6.

Figure 7:
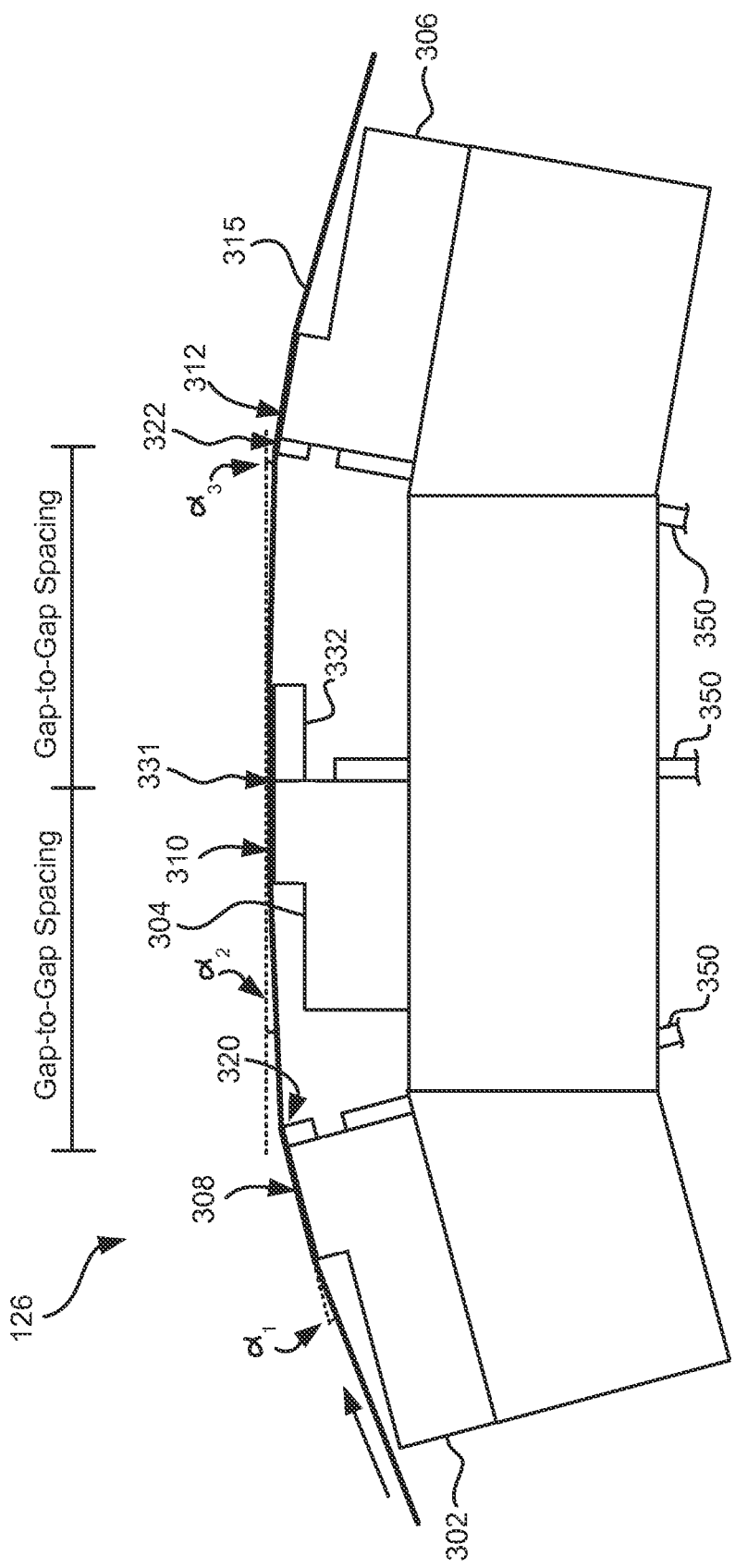
FIG. 7 is a side view of a magnetic tape head with three modules in an overwrap configuration.

FIG. 7 illustrates an embodiment where the modules 302, 304, 306 are in an overwrap configuration. Particularly, the tape bearing surfaces 308, 312 of the outer modules 302, 306 are angled slightly more than the tape 315 when set at the desired wrap angle $\alpha_2$ relative to the second module 304. In this embodiment, the tape does not pop off of the trailing module, allowing it to be used for writing or reading. Accordingly, the leading and middle modules can both perform reading and/or writing functions while the trailing module can read any just-written data. Thus, these embodiments are preferred for write-read-write, read-write-read, and write-write-read applications. In the latter embodiments, closures should be wider than the tape canopies for ensuring read capability. The wider closures will force a wider gap-to-gap separation. Therefore a preferred embodiment has a write-read-write configuration, which may use shortened closures that thus allow closer gap-to-gap separation.

Additional aspects of the embodiments shown in FIGS. 6 and 7 are similar to those given above.

A 32 channel version of a multi-module head 126 may use cables 350 having leads on the same pitch as current 16 channel piggyback LTO modules, or alternatively the connections on the module may be organ-keyboarded for a 50% reduction in cable span. Over-under, writing pair unshielded cables can be used for the writers, which may have integrated servo readers.

The outer wrap angles at may be set in the drive, such as by guides of any type known in the art, such as adjustable rollers, slides, etc. For example, rollers having an offset axis may be used to set the wrap angles. The offset axis creates an orbital arc of rotation, allowing precise alignment of the wrap angle $\alpha_1$.

To assemble any of the embodiments described above, conventional u-beam assembly can be used. Accordingly, the mass of the resultant head can be maintained or even reduced relative to heads of previous generations. In other approaches, the modules may be constructed as a unitary body. Those skilled in the art, armed with the present teachings, will appreciate that other known methods of manufacturing such heads may be adapted for use in constructing such heads.

As noted above, tape lateral expansion and contraction present many challenges to increasing data track density on conventional products. Conventional products have attempted to compensate for tape lateral expansion and contraction by controlling tape width by tension and improving the characteristics of the media itself. However, these methods fail to fully cancel the tape lateral expansion and contraction, and actually lead to other problems, including tape stretch and media cost increases, respectively.

Figure 8A:
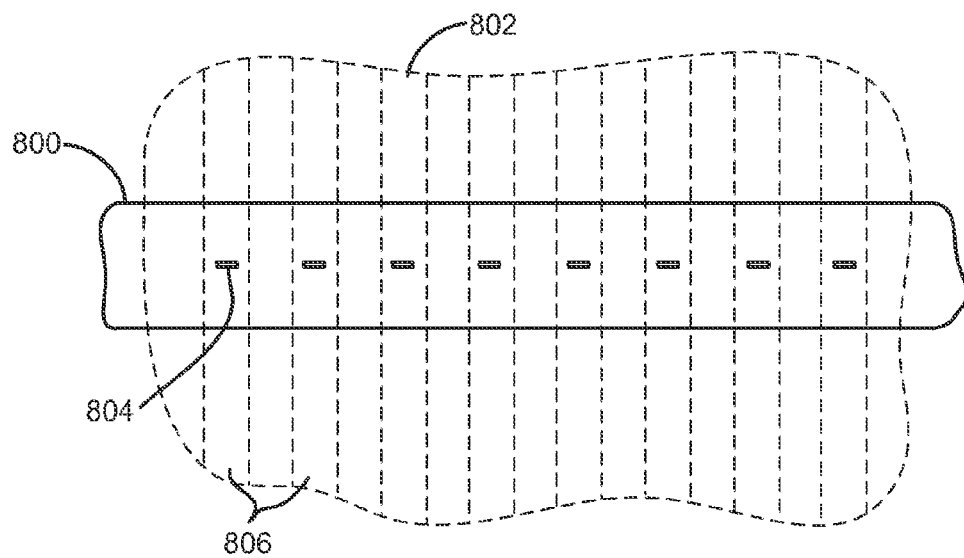
FIGS. 8A-8C are partial top-down views of one module of a magnetic tape head according to one embodiment.
Figure 8B:
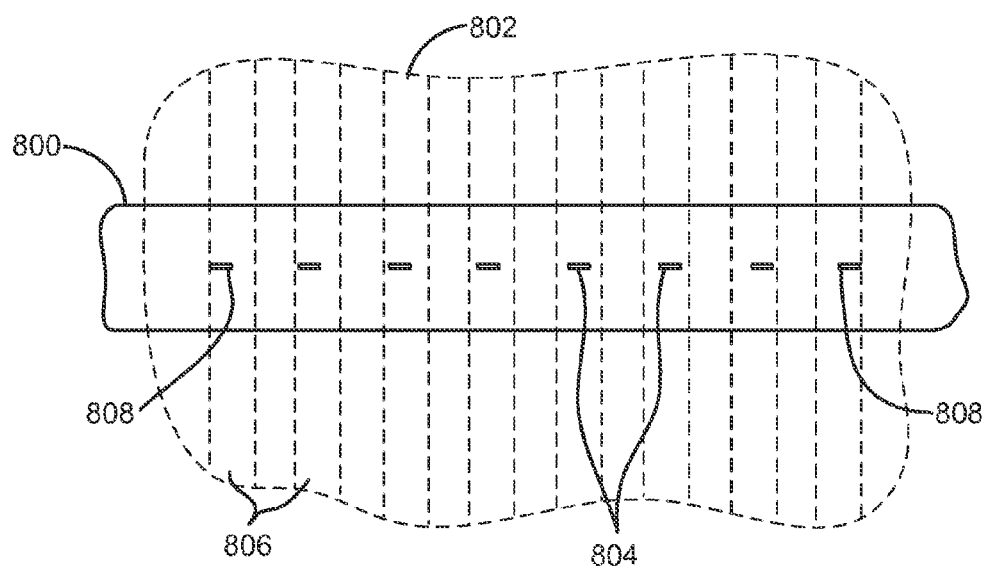
Figure 8C:
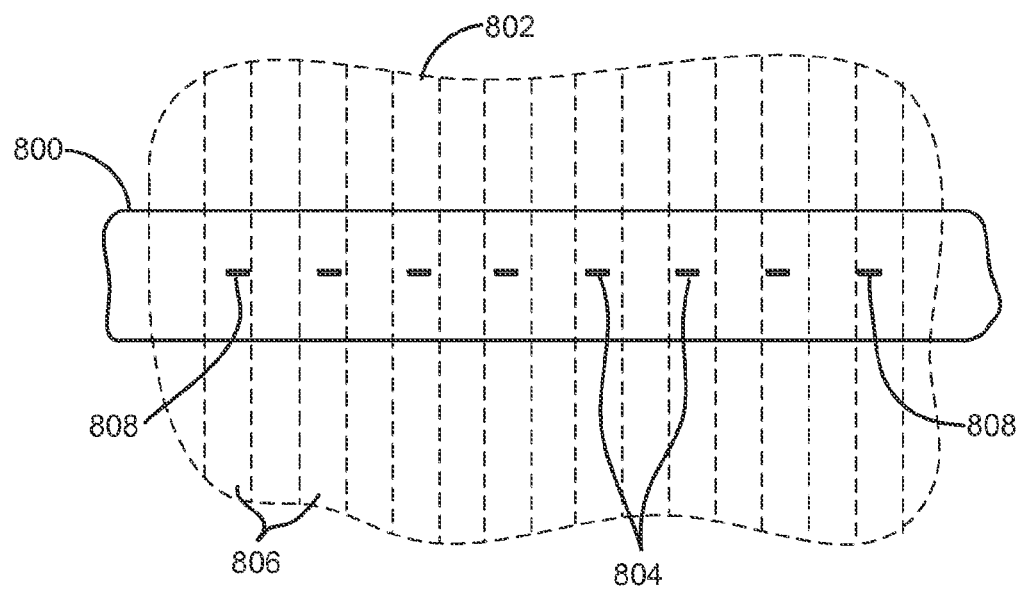

FIGS. 8A-8C are intended to depict the effect of tape lateral expansion and contraction on transducer arrays position relative thereto, and are in no way intended to limit the invention. FIG. 8A depicts a module 800 relative to the tape 802, where the tape has a nominal width. As shown, the transducers 804 are favorably aligned with the data tracks 806 on the tape 802. However, FIG. 8B illustrates the effect of tape lateral contraction. As shown, contraction of the tape causes the data tracks to contract as well, and the outermost transducers 808 are positioned along the outer edges of the outer data tracks as a result. Moreover, FIG. 8C depicts the effect of tape lateral expansion. Here expansion of the tape causes the data tracks to move farther apart, and the outermost transducers 808 are positioned along the inner edges of the outer data tracks as a result. If the tape lateral contraction is greater than that shown in FIG. 8B, or the tape lateral expansion is greater than that shown in FIG. 8C, the outermost transducers 808 will cross onto adjacent tracks, thereby causing the adjacent tracks to be overwritten during a writing operation and/or resulting in readback of the wrong track during a readback operation. Moreover, running effects, such as tape skew and lateral shifting may exacerbate such problems, particularly for tape having shingled data tracks.

Thus, it would be desirable to develop a tape drive system able to read and/or write tracks onto the tape in the proper position, regardless of the extent of tape lateral expansion and/or contraction at any given time. Various embodiments described and/or suggested herein overcome the foregoing challenges of conventional products, by orienting at least two modules of a tape drive system, such as by rotating, pivoting and/or tilting, thereby selectively altering the pitch of the transducers in their arrays, as will soon become apparent.

By selectively orienting a module, the pitch of the transducers on the module is thereby altered, preferably aligning the transducers with the tracks on a tape for a given tape lateral expansion and/or contraction. Tape contraction (shrinkage) can be dealt with by orienting a nominally non-offset head, but tape expansion (dilation) cannot. Thus, to accommodate both shrinkage and dilation about a "nominal," the head must be statically positioned at a nominal angle of at least approximately 0.2° as will be explained below. Thereafter, smaller angular adjustments (e.g., about 1° or lower, but could be more) may be made to the already-oriented module in order to compensate for any variation of the tape lateral expansion and/or contraction, thereby keeping the transducers aligned with tracks on the tape.

Figure 9A:
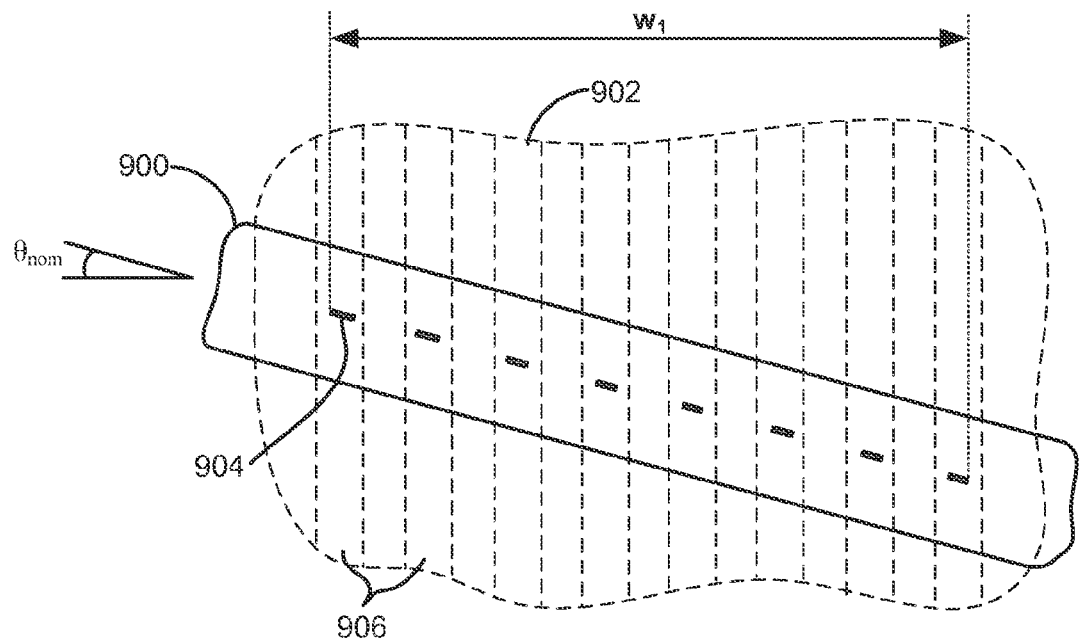
FIGS. 9A-9C are partial top-down views of one module of a magnetic tape head according to one embodiment.
Figure 9B:
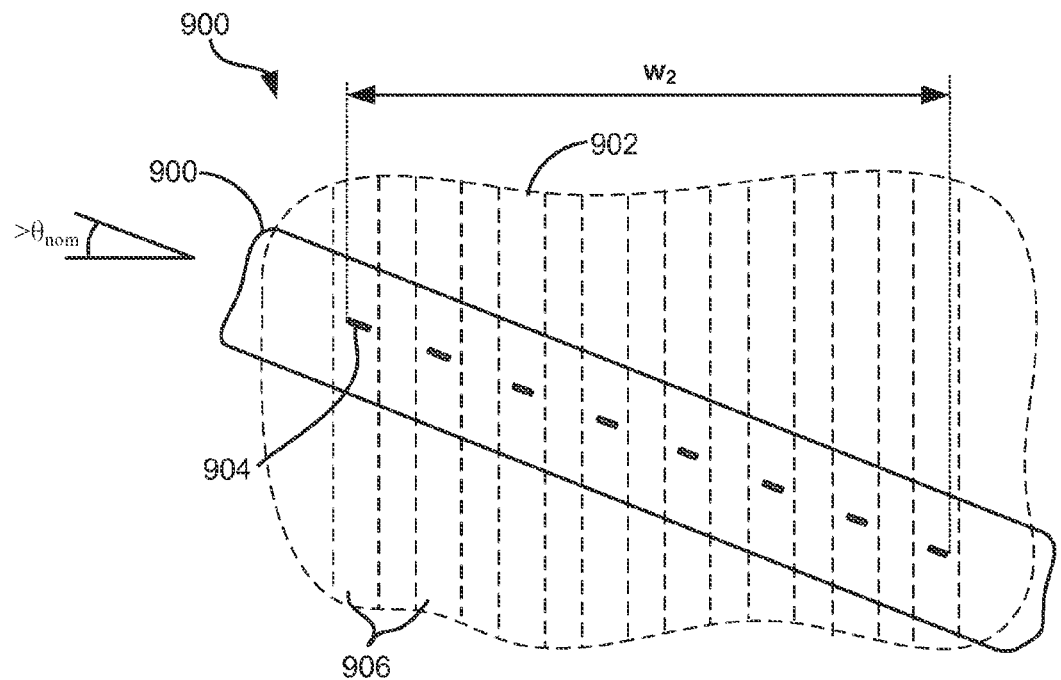
Figure 9C:
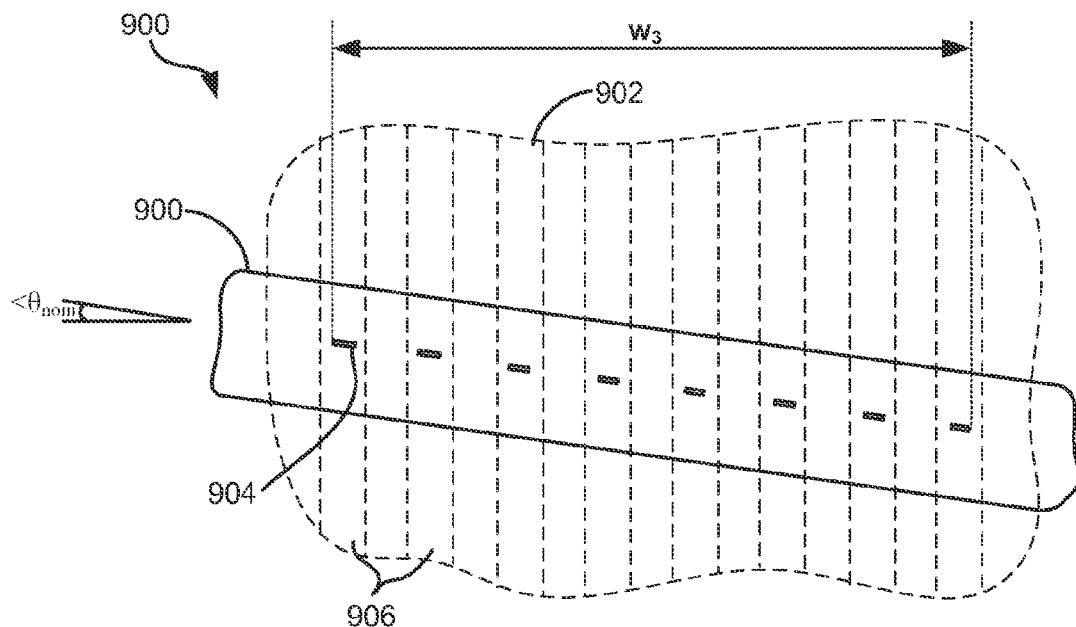

FIGS. 9A-9C illustrate representational views of the effects of orienting a module having transducer arrays. It should be noted that the angles of orientation illustrated in FIGS. 9A-9C are an exaggeration (e.g., larger than would typically be observed), and are in no way intended to limit the invention.

Referring to FIG. 9A, the module 900 is shown relative to the tape 902, where the tape has a nominal width. As illustrated, the module 900 is oriented at an angle $\theta_{nom}$ such that the transducers 904 are favorably aligned with the data tracks 906 on the tape 902. However, when the tape 902 experiences tape lateral contraction and/or expansion, the data tracks 906 on the tape contract and/or expand as well. As a result, the transducers on the module are no longer favorably aligned with the data tracks 906 on the tape 902.

In FIG. 9B, the tape 902 has experienced tape lateral contraction. Therefore, in a manner exemplified by FIG. 8B, the transducers 904 on the module 900 of FIG. 9B would no longer be favorably aligned with the data tracks 906 on the tape 902 if no adjustment were made. However, as alluded to above, smaller angular adjustments may be made to the already-oriented module 900 in order to compensate for tape lateral contraction. Therefore, referring again to FIG. 9B, the angle of orientation$>\theta_{nom}$ of the module 900 is further positioned at an angle greater than $\theta_{nom}$. By increasing the angle$>\theta_{nom}$ the effective width $w_2$ of the array of transducers decreases from the effective width $w_1$ illustrated in FIG. 9A. This also translates to a reduction in the effective pitch between the transducers, thereby realigning the transducers along the contracted data tracks 906 on the tape 902 as shown in FIG. 9B.

On the other hand, when the tape experiences tape lateral expansion, the data tracks on the tape expand as well. As a result, the transducers on the module would no longer be favorably aligned with the data tracks on the tape if no adjustments were made. With reference to FIG. 9C, the tape 902 has experienced tape lateral expansion. As a result, further angular adjustments may be made to the angle of orientation of the module in order to compensate for the tape lateral expansion. Therefore, referring again to FIG. 9C, the angle of orientation$<\theta_{nom}$ of the module 900 is reduced to an angle less than $\theta_{nom}$. By decreasing the angle of orientation$<\theta_{nom}$ the effective width $w_3$ of the array of transducers 904 increases from the effective width $w_1$ illustrated in FIG. 9A. Moreover, reducing the effective width of the array of transducers 904 also causes the effective pitch between the transducers to be reduced, thereby realigning the transducers along the data tracks 906 on the tape 902.

In a preferred approach, magnetic tape systems have two or more modules, each having an array of transducers, typically in a row. Depending on the desired embodiment, the additional rows of transducers may allow the system to read verify during the write process, but is not limited thereto. As mentioned above, the foregoing conventional challenges may be overcome, e.g., by rotating a given module about an axis orthogonal to the plane in which its array resides (e.g., parallel to the plane of the tape bearing surface), thereby selectively altering the pitch of the transducers in the array.

By providing a system that compensates for tape lateral expansion and/or contraction, various embodiments enable use of wider readers, resulting in a better signal to noise ratio (SNR), and/or smaller data tracks, resulting in a higher capacity per unit area of the media.

Figure 10A:
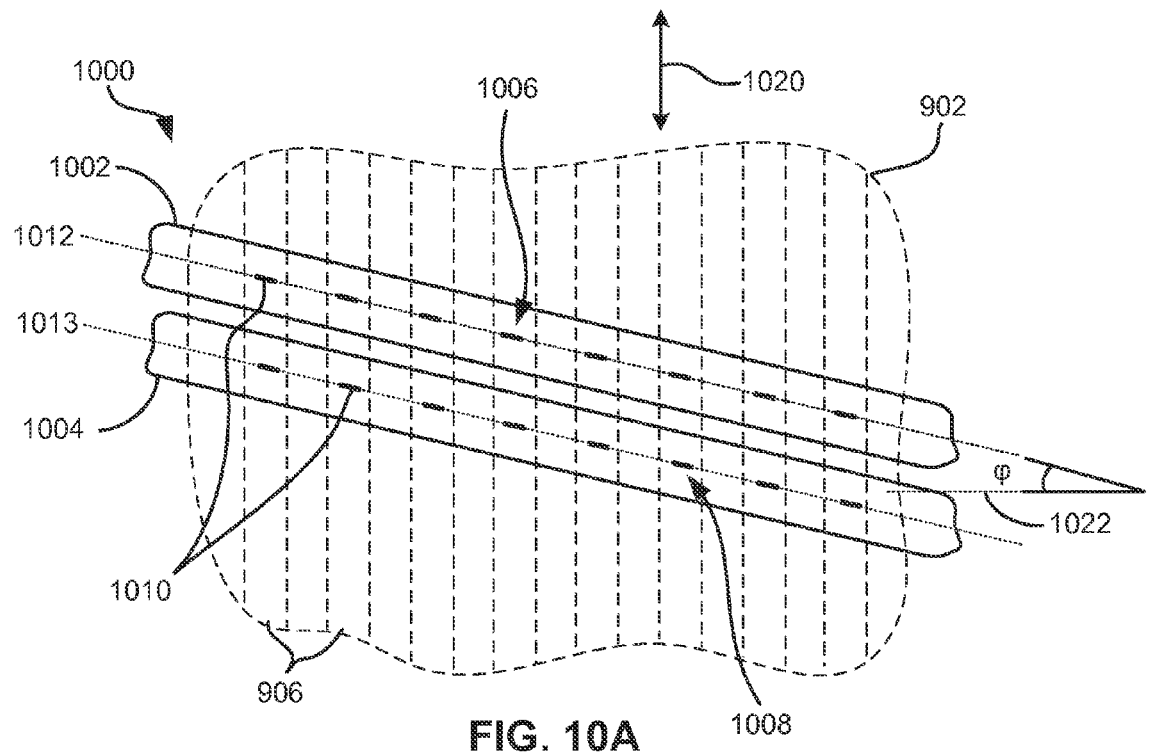
FIG. 10A is a partial top-down view of an apparatus with two modules according to one embodiment.
Figure 10B:
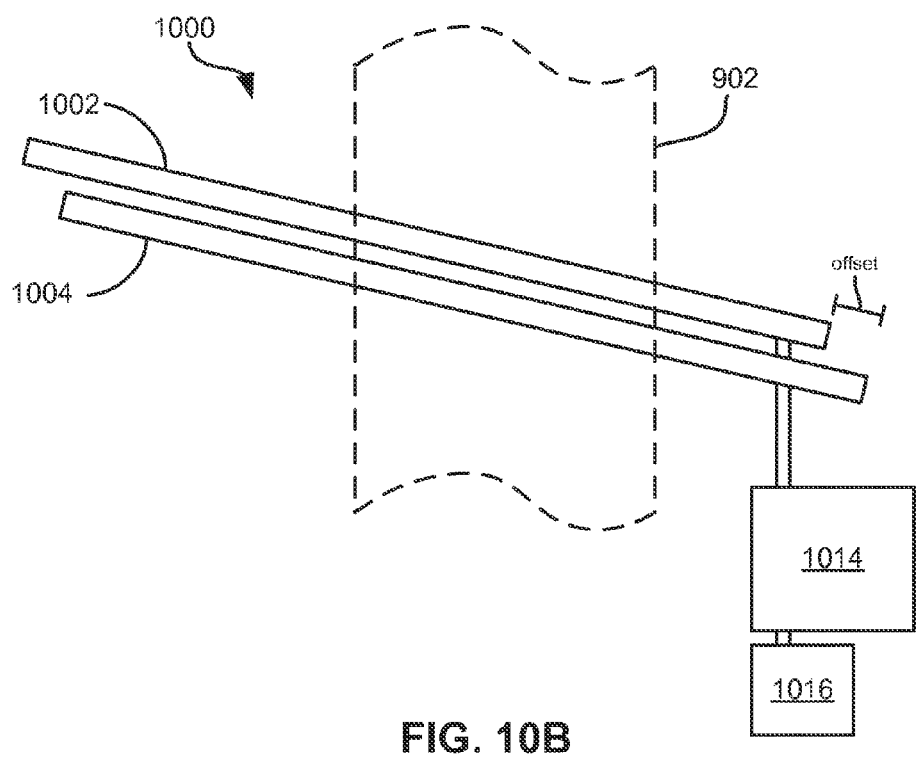
FIG. 10B is a diagram of the system having the apparatus of FIG. 10A.

FIGS. 10A-10B depict an apparatus 1000 for compensating for tape lateral expansion and/or contraction, in accordance with one embodiment. As an option, the present system 1000 may be implemented in conjunction with features from any other embodiment listed herein, such as those described with reference to the other FIGS. Of course, however, system 1000 and others presented herein may be used in various applications and/or in permutations which may or may not be specifically described in the illustrative embodiments listed herein. Further, the system 1000 presented herein may be used in any desired environment.

Referring to FIGS. 10A-10B, the system 1000 includes modules 1002, 1004, each of which have an array 1006, 1008 of transducers 1010. The modules 1002, 1004, are preferably fixed relative to each other. In view of the present description, "fixed" is intended to mean constrained from a directional movement relative to each other such that the arrays of each maintain a fixed position relative to each other. According to various approaches, the modules may be fixed relative to each other by using rods, fasteners, adhesives, cables, wire, etc. Moreover, according to different embodiments, the modules are preferably fixed relative to each other prior to being installed in the system 1000, head, etc. depending on the desired embodiment. However, the modules are preferably selectively orientable (e.g., tiltable and/or rotatable) as a single structure about a pivot point while remaining fixed relative to each other, as will soon become apparent.

With continued reference to FIGS. 10A-10B, the modules 1002, 1004, are preferably fixed such that the axes 1012, 1013 of the arrays 1006, 1008 are oriented about parallel to each other, respectively. As illustrated in FIGS. 10A-10B, the axes 1012, 1013 of each array of transducers are defined by the dashed lines that lie between opposite ends thereof, e.g., positioned farthest apart.

Referring now to FIG. 10A, the array 1006 of a first module 1002 is offset from the array 1008 of a second module 1004 in a first direction parallel to the axis 1013 of the array 1008 of the second module 1004. The modules 1002, 1004 are also set to a nominal angle in the drive so that the transducers of the arrays are aligned along the data tracks 906 on a tape 902 having nominal tape lateral expansion.

With continued reference to FIG. 10A, the arrays 1006, 1008 of the transducers 1010 of the first and second modules are preferably offset such that the transducers 1010 of the first module 1002 are about aligned with the transducers 1010 of the second module 1004 in a direction 1020 of tape travel thereacross when the axes are oriented at an angle $\phi$ between greater than about 0.05° and about 45°. Preferably, the angle $\phi$ is between greater than about 0.2° and about 10°, and ideally between greater than about 0.25° and about 5°, relative to a line 1022 oriented perpendicular to the direction 1020 of tape travel.

In addition, the inventors have surprisingly and unexpectedly found that the various embodiments described below, and having the angle $\phi$ in the range between greater than about 0.2° and about 10°, enable writing and reading that does not steer the tape or cause media damage over the life of the tape. For example, the inventors expected the skiving edges of the modules to steer the tape laterally.

Angles of orientation greater than within the specified range (e.g., greater than about 10°) are undesirable as the higher angles cause steering of the tape when used. However, as described above, the angles of orientation within the specified range unexpectedly and unforeseeably did not result in steering of the tape. Moreover, it is more difficult to distinguish between tape lateral expansion and/or contraction and skew when angles of orientation of the modules is greater than within the specified range. This may cause difficulties when matching the dimensional conditions of the tape and/or orientation of the modules of the current operation to that of the previous operation (explained in further detail below). It should also be noted that the angle of orientation φ illustrated in FIG. 10A is exaggerated (e.g., larger than within the desired range), and is in no way intended to limit the invention.

Depending on the desired embodiment, the modules themselves may be offset to effect the shifting of the transducer arrays, e.g., as shown by the offset (offset) in FIG. 10B. Alternatively, the transducer arrays may be positioned on the respective module in a specified position to effect the offset while the modules themselves are not offset in the drive; or combinations thereof.

With continued reference to FIG. 10B, the system 1000 includes a mechanism 1014, such as a tape dimensional instability compensation mechanism, for orienting the modules to control a transducer pitch presented to a tape. The tape dimensional instability compensation mechanism 1014 preferably allows for the orienting of the modules to be done while the modules are reading and/or writing. The tape dimensional instability compensation mechanism 1014 may be any known mechanism suitable for orienting the modules. Illustrative tape dimensional instability compensation mechanisms 1014 include worm screws, voice coil actuators, thermal actuators, piezoelectric actuators, etc.

A controller 1016 in one approach is configured to control the tape dimensional instability compensation mechanism 1014 based on a readback signal of the tape, e.g., servo signals, data signals, a combination of both, etc. In another approach, the dimensional conditions of the tape and/or orientation of the modules when the tape was written may be retrieved e.g., from a database, cartridge memory, etc., and the orientation may be set based thereon to about match the transducer pitch of the current operation to that of the previous operation.

In various approaches, additional logic, computer code, commands, etc., or combinations thereof, may be used to control the tape dimensional instability compensation mechanism 1014 for adjusting the orientation of the modules based on a skew of the tape. Moreover, any of the embodiments described and/or suggested herein may be combined with various functional methods, depending on the desired embodiment.

Figure 10C:
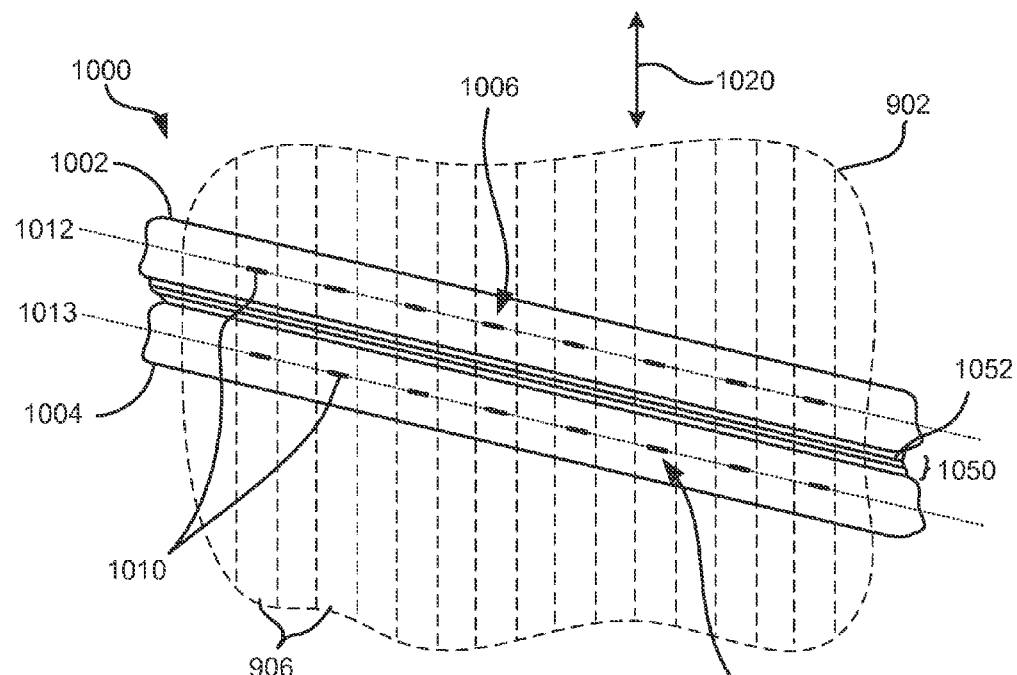
FIG. 10C is a partial top-down view of an apparatus with two modules according to one embodiment.

FIG. 10C depicts a variation of an apparatus as shown in FIG. 10A, and like elements are numbered the same in both FIGS. Referring to FIG. 10C, a spacer member 1050 extends between tape bearing surfaces of the modules. The spacer member 1050 may be recessed from a plane of the tape bearing surfaces, but is preferably coplanar therewith and/or otherwise forms a portion of the overall tape bearing surface of the head.

In one approach, the spacer member 1050 includes a magnetic shield 1052 for magnetically shielding the array of transducers from the second array of transducers. Such magnetic shield may be formed of any suitable material known in the art, such as NiFe, CoFe, etc. The magnetic shield may extend from the tape bearing surface, or some point therebelow, in a height direction (into the tape bearing surface), preferably for a distance that provides the desired shielding effect. For example, the shield may have a height similar to that of shields of the transducers.

Figure 10D:
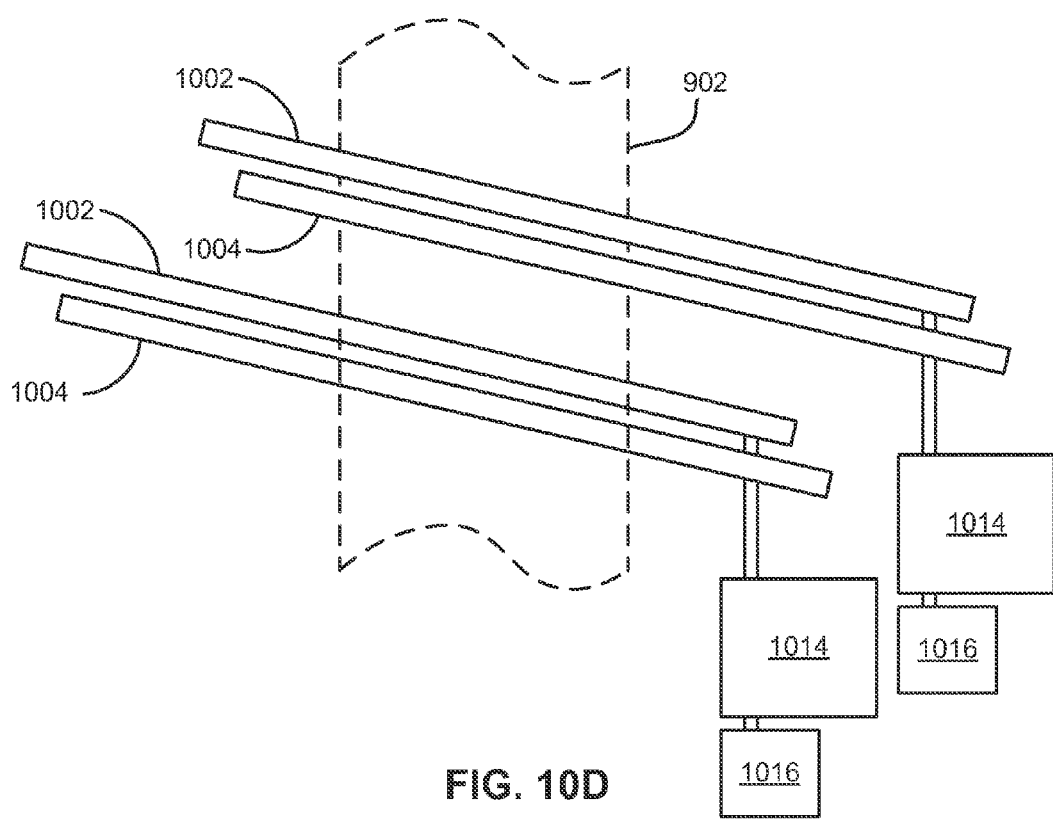
FIG. 10D is a partial top-down view of a system with multiple sets of modules according to one embodiment.

FIG. 10D depicts an alternate embodiment, similar to that of FIG. 10B, but having two sets of modules, where each set may include two or more modules. Each set of modules is preferably independently orientable to set the angle of orientation. Each set may also be independently positionable for track following.

In one approach, the outer modules of each set may be configured for writing, and the inner modules configured for reading. Thus, in one illustrative use case, the writers on the outer module of one set may write while the readers of an inner module of the second set may read back the just-written track. In another illustrative use case, the writers on the outer module of one set may write while the readers of an inner module of the same set may read back the just-written track.

Figure 11:
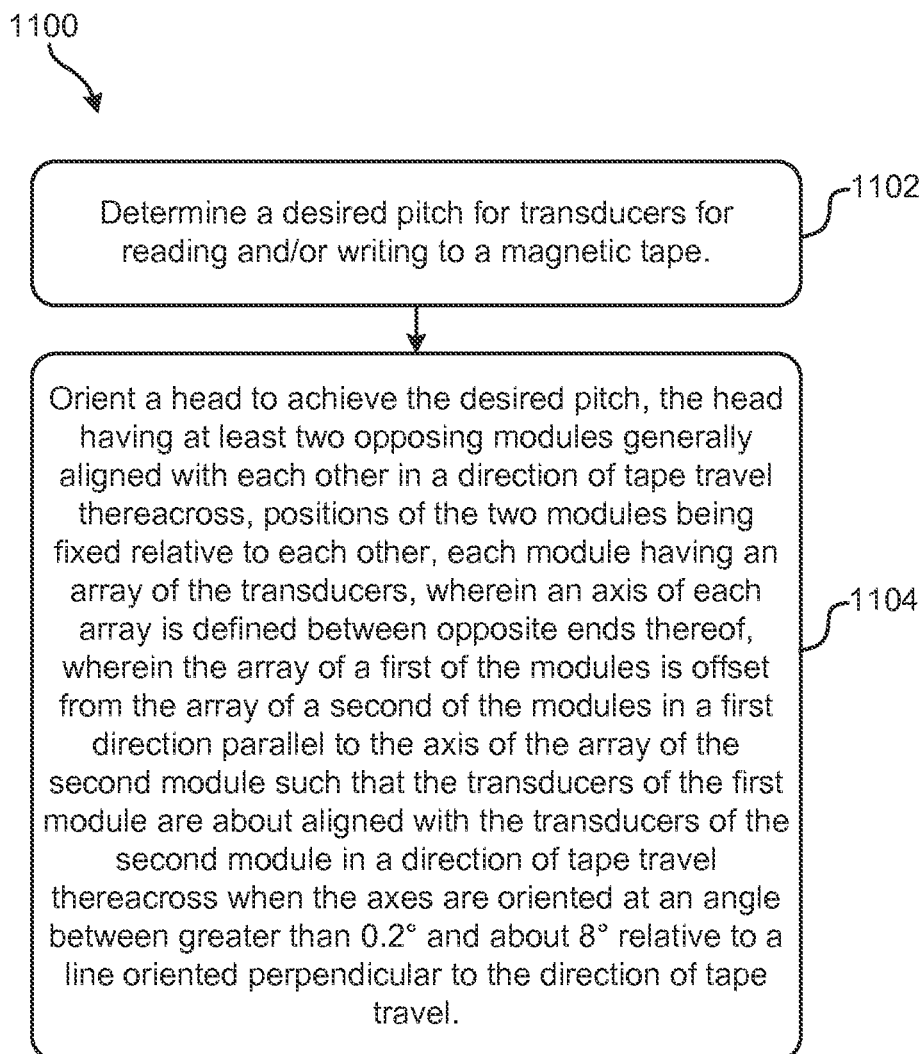
FIG. 11 is a flow chart of a method according to one embodiment.

FIG. 11 depicts a method 1100 for orienting modules having transducers, in accordance with one embodiment. Such method 1100 may be implemented by the controller of FIG. 10B. As an option, the present method 1100 may be implemented in conjunction with features from any other embodiment listed herein, such as those described with reference to the other FIGS. Of course, however, such method 1100 and others presented herein may be used in various applications and/or in permutations which may or may not be specifically described in the illustrative embodiments listed herein. Further, the method 1100 presented herein may be used in any desired environment.

Referring now to FIG. 11, the method 1100 includes determining a desired pitch for transducers for reading and/or writing to a magnetic tape as illustrated in operation 1102. In one approach, the desired pitch may be determined by the state of the tape. An exemplary mechanism for establishing the proper pitch is to use the timing interval read by two servo readers to determine the state of the tape, e.g., contracted, expanded or nominal. Although a preferred mode is to use servo data, this is not absolutely required. Thus, it may be desirable to determine the state of the tape, e.g., by incorporating any of the approaches described and/or suggested herein and/or known processes, when determining the desired pitch. However, according to other approaches, the pitch may be determined using any approach described and/or suggested herein, or combinations thereof.

Method 1100 further includes orienting a head to achieve the desired pitch, the head having at least two opposing modules generally aligned with each other in a (n intended) direction of tape travel thereacross, positions of the two modules being fixed relative to each other, each module having an array of the transducers, where an axis of each array is defined between opposite ends thereof, where the array of a first of the modules is offset from the array of a second of the modules in a first direction parallel to the axis of the array of the second module such that the transducers of the first module are about aligned with the transducers of the second module in a direction of tape travel thereacross when the axes are oriented at an angle between greater than 0.2° and about 10° relative to a line oriented perpendicular to the direction of tape travel. See operation 1104.

In another approach, steps 1102 and 1104 may be performed concurrently. For example, in one embodiment the proper transducer pitch may be based on data signals. One way to implement this is by first setting the transducer pitch at a nominal value by selecting a nominal angle, and then adjusting the orientation thereof to obtain a better readback quality across the read channels. The quality may be determined for example by finding the lowest error rate, best signal to noise level, etc.

As an option, the system may continue or periodically monitor the appropriate signals and adjust the orientation. Adjustments can be performed any time, such as during an initialization period prior to reading or writing user data, during readback or writing operations, etc.

Although two modules 1002, 1004 are illustrated in FIGS. 10A-10B, in other approaches, a system may include any number of modules e.g., at least two, at least three, at least four, a plurality, etc. depending on the desired embodiment. Referring to the illustrative embodiment depicted in FIG. 12, which may be considered a modification of system 1000 of FIG. 10A, the system 1200 shown may include a third module 1202 positioned between the first and second modules 1002, 1004. As shown, the array of transducers of the third module 1202 is preferably offset from the array of the first module 1002 in a first direction 1204. Moreover, the extent of the offset $t_1$ of the array of the third module 1202 relative to the array of the first module 1002 is less than an extent of the offset $t_2$ of the array of the second module 1004 relative to the array of the first module 1002.

According to different approaches, the first second and/or third modules 1002, 1004, 1202 may be used for data writing and/or data reading, depending on the desired embodiment. Thus, the system 1200 may serve as a write-read-write (WRW) device if the first and second modules 1002, 1004 are designed for at least data writing and the third module 1202 is designed for at least data reading. As an option, the first and second modules 1002, 1004 may be designed for data writing and not for data reading, and/or the third module 1202 may be designed for data reading and not for data writing.

In another approach, the system 1200 may serve as a read-write-read (RWR) device if the first and second modules 1002, 1004 are designed for at least data reading and optionally not for data writing, while the third module 1202 is designed for at least data writing and optionally not for data reading. However, this is in no way meant to limit the invention; according to various other approaches, a third, fourth, fifth, etc. module may be positioned with any orientation relative to other modules of the system, depending on the desired embodiment.

Figure 12:
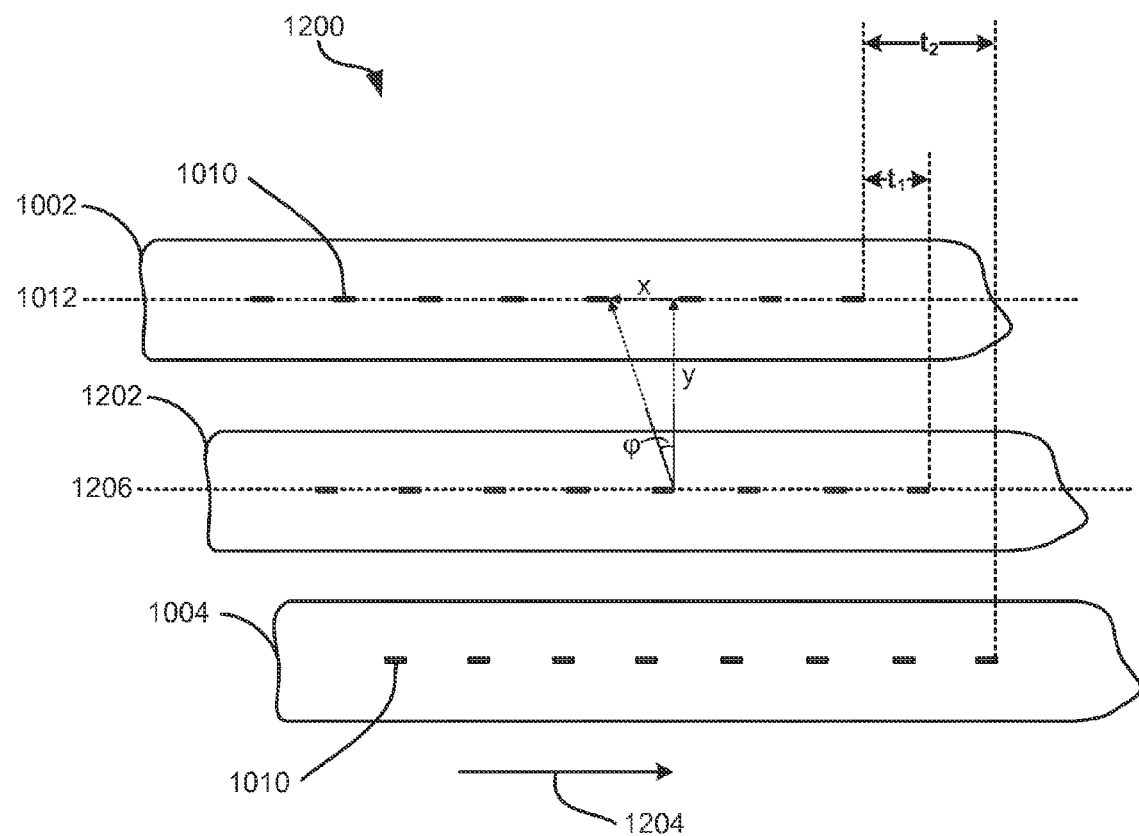
FIG. 12 is a partial top-down view of a magnetic head with three modules according to one embodiment.

With continued reference to FIG. 12, according to one approach, the angle of orientation φ of the modules 1002, 1202, 1004 and distance y between the arrays may be used to calculate the offset x. As illustrated, the offset x is between the arrays of transducers of the modules in a direction parallel to their axes 1012, 1206, which may be calculated using Equation 1.

$$\tan(\phi)=x/y \qquad \text{Equation 1}$$

Equation 1 can be rewritten into Equation 2.

$$y(\tan(\phi))=x \qquad \text{Equation 2}$$

Other known methods of calculating and/or assigning the offset x and distance y between the arrays of any of the modules may be used in other embodiments.

It will be clear that the various features of the foregoing systems and/or methodologies may be combined in any way, creating a plurality of combinations from the descriptions presented above.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as "logic," a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a non-transitory computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage medium include the following: a portable computer diskette, a hard disk, a random access memory (RAM), a read-only memory (ROM), an erasable programmable read-only memory (EPROM or Flash memory), a portable compact disc read-only memory (e.g., CD-ROM), a Blu-ray disc read-only memory (BD-ROM), an optical storage device, a magnetic storage device, or any suitable combination of the foregoing. In the context of this document, a non-transitory computer readable storage medium may be any tangible medium that is capable of containing, or storing a program or application for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a non-transitory computer readable storage medium and that can communicate, propagate, or transport a program for use by or in connection with an instruction execution system, apparatus, or device, such as an electrical connection having one or more wires, an optical fibre, etc.

Program code embodied on a computer readable medium may be transmitted using any appropriate medium, including but not limited to wireless, wireline, optical fibre cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer, for example through the Internet using an Internet Service Provider (ISP).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart(s) and/or block diagram block or blocks.

It will be further appreciated that embodiments of the present invention may be provided in the form of a service deployed on behalf of a customer.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A computer program product for orienting a head, the computer program product comprising a non-transitory computer readable storage medium having program instructions embodied therewith, the program instructions readable and/or executable by a controller to cause the controller to:
   determine, by the controller, a desired pitch for transducers for reading and/or writing to a magnetic tape; and
   cause, by the controller, a mechanism to orient a head to achieve the desired pitch, the head having at least two opposing modules generally aligned with each other in an intended direction of tape travel thereacross, positions of the two modules being fixed relative to each other, each module having an array of the transducers, wherein an axis of each array is defined between opposite ends thereof, wherein the array of a first of the modules is offset from the array of a second of the modules in a first direction parallel to the axis of the array of the second module such that the transducers of the first module are about aligned with the transducers of the second module in the intended direction of tape travel thereacross when the axes are oriented at an angle between greater than 0.2° and about 10° relative to a line oriented perpendicular to the intended direction of tape travel,
   wherein determining the desired pitch for the transducers for reading and/or writing to the tape includes determining a state of expansion of the tape based on a readback signal from the tape, the readback signal being derived from the transducers of the modules of the parallel arrays when the axes of the arrays are oriented at an angle greater than 0.2° relative to the line oriented perpendicular to the intended direction of tape travel thereacross.

2. The computer program product as recited in claim 1, comprising program instructions readable and/or executable by the controller to cause the controller to determine a state of the tape, the desired pitch being determined based on the state of the tape.

3. A computer program product as recited in claim 1, wherein the head has only two modules.

4. A computer program product as recited in claim 1, wherein the head has three modules, a third one of the modules being positioned between the first and second modules, wherein the array of the third module is offset from the array of the first module in the first direction, wherein an extent of the offset of the array of the third module relative to the array of the first module is less than an extent of the offset of the array of the second module relative to the array of the first module.

5. The computer program product as recited in claim 4, wherein the first and second modules are configured for data reading and are not configured for data writing, wherein the third module is configured for data writing and is not configured for data reading.

6. The computer program product as recited in claim 4, wherein the first and second modules are configured for data writing and are not configured for data reading, wherein the third module is configured for data reading and is not configured for data writing.

7. The computer program product as recited in claim 1, wherein the angle is between 0.25° and about 5°.

8. The computer program product as recited in claim 1, comprising program instructions readable and/or executable by the controller to cause the controller to control the mechanism for altering the angle at which the axes are oriented relative to the line oriented perpendicular to the intended direction of tape travel to achieve the desired pitch based on the state of expansion of the tape.

9. The computer program product as recited in claim 1, comprising program instructions readable and/or executable by the controller to cause the controller to control the mechanism for altering the angle at which the axes are oriented relative to the line oriented perpendicular to the intended direction of tape travel to achieve the desired pitch based on a skew of the tape.

10. A computer program product for orienting a head, the computer program product comprising a non-transitory computer readable storage medium having program instructions embodied therewith, the program instructions readable and/or executable by a controller to cause the controller to:
    determine, by the controller, a state of expansion of a magnetic tape based on a readback signal of the tape;
    determine, by the controller, a desired pitch for transducers for reading and/or writing to the tape based on the expansion of the tape; and
    control, by the controller, a mechanism for orienting a head having the transducers based on the state of expansion of the tape, the head having at least two opposing modules generally aligned with each other in an intended direction of tape travel thereacross, positions of the two modules being fixed relative to each other, each module having an array of the transducers, wherein an axis of each array is defined between opposite ends thereof, wherein the array of a first of the modules is offset from the array of a second of the modules in a first direction parallel to the axis of the array of the second module such that the transducers of the first module are about aligned with the transducers of the second module in the intended direction of tape travel thereacross when the axes are oriented at an angle between greater than 0.25° and about 5° relative to a line oriented perpendicular to the intended direction of tape travel, wherein determining the state of expansion of the tape includes orienting the head to orient the axes at an angle greater than 0.2° relative to the line oriented perpendicular to the intended direction of tape travel during acquisition of the readback signal of the tape, the readback signal being derived from the transducers of the modules of the parallel arrays.

11. The computer program product as recited in claim 10, wherein determining the desired pitch for transducers for reading and/or writing to the tape is also based on a skew of the tape.

12. A computer program product as recited in claim 10, wherein the head has three modules, a third one of the modules being positioned between the first and second modules, wherein the array of the third module is offset from the array of the first module in the first direction, wherein an extent of the offset of the array of the third module relative to the array of the first module is less than an extent of the offset of the array of the second module relative to the array of the first module.

13. The computer program product as recited in claim 12, wherein the first and second modules are configured for data reading and are not configured for data writing, wherein the third module is configured for data writing and is not configured for data reading.

14. The computer program product as recited in claim 12, wherein the first and second modules are configured for data writing and are not configured for data reading, wherein the third module is configured for data reading and is not configured for data writing.

15. The computer program product as recited in claim 11, wherein the head has only two modules.

* * * * *